(12) United States Patent
Shibata

(10) Patent No.: US 8,259,400 B2
(45) Date of Patent: Sep. 4, 2012

(54) ZOOM LENS SYSTEM, IMAGING APPARATUS, AND METHOD FOR MANUFACTURING ZOOM LENS SYSTEM

(75) Inventor: Satoru Shibata, Yokohama (JP)

(73) Assignee: Nikon Corporation, Tokyo (JP)

( * ) Notice: Subject to any disclaimer, the term of this patent is extended or adjusted under 35 U.S.C. 154(b) by 170 days.

(21) Appl. No.: 12/625,358

(22) Filed: Nov. 24, 2009

(65) Prior Publication Data

US 2010/0188755 A1     Jul. 29, 2010

(30) Foreign Application Priority Data

Jan. 26, 2009   (JP) .................. 2009-014768
Jan. 26, 2009   (JP) .................. 2009-014770
Jan. 26, 2009   (JP) .................. 2009-014771

(51) Int. Cl.
*G02B 9/34*           (2006.01)
(52) U.S. Cl. ...................................... 359/781
(58) Field of Classification Search .............. 359/686, 359/771, 781
See application file for complete search history.

(56) References Cited

U.S. PATENT DOCUMENTS 5,835,272 A * 11/1998 Kodama ............... 359/557
2006/0061873 A1 * 3/2006 Saori ..................... 359/680

FOREIGN PATENT DOCUMENTS

| JP | 11-231220 A | 8/1999 |
| JP | 2001-083421 A | 3/2001 |
| JP | 2001-183585 A | 7/2001 |

* cited by examiner

*Primary Examiner* — Joseph P Martinez
(74) *Attorney, Agent, or Firm* — Miles & Stockbridge P.C.

(57) ABSTRACT

A zoom lens system including, in order from an object, a first lens group G1 having negative refractive power, a second lens group G2 having positive refractive power, a third lens group G3 having negative refractive power, and a fourth lens group G4 having positive refractive power, upon zooming from a wide-angle end state W to a telephoto end state T, varying respective distances between adjacent lens groups G1, G2, G3, G4, shifting at least one portion of the third lens group G3 in a direction including a component perpendicular to the optical axis, and satisfying given conditional expressions, thereby providing a zoom lens system having a lens capable of moving in a direction including a component perpendicular to the optical axis, and realizing a high zoom ratio and excellent optical performance.

25 Claims, 20 Drawing Sheets

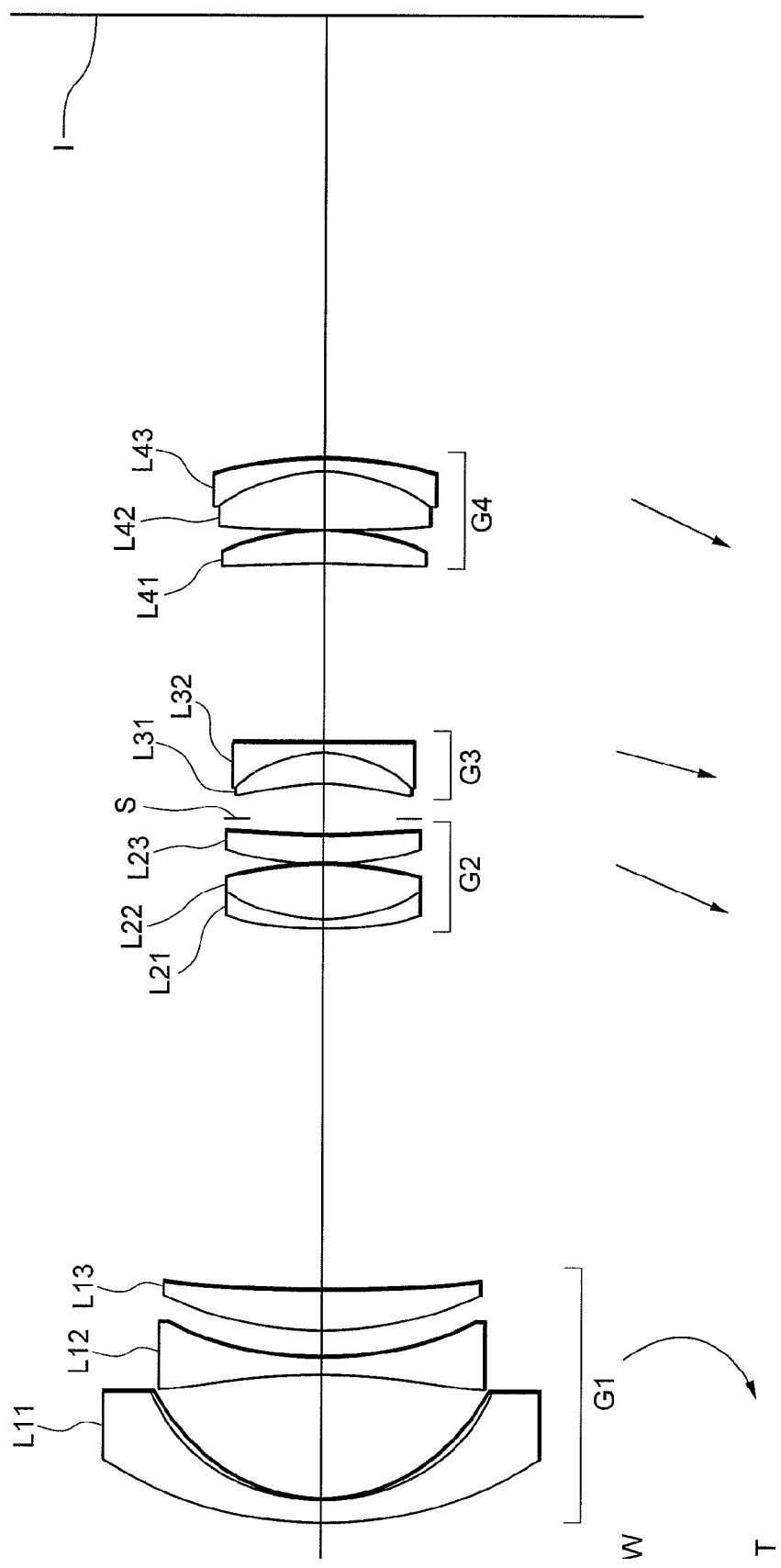

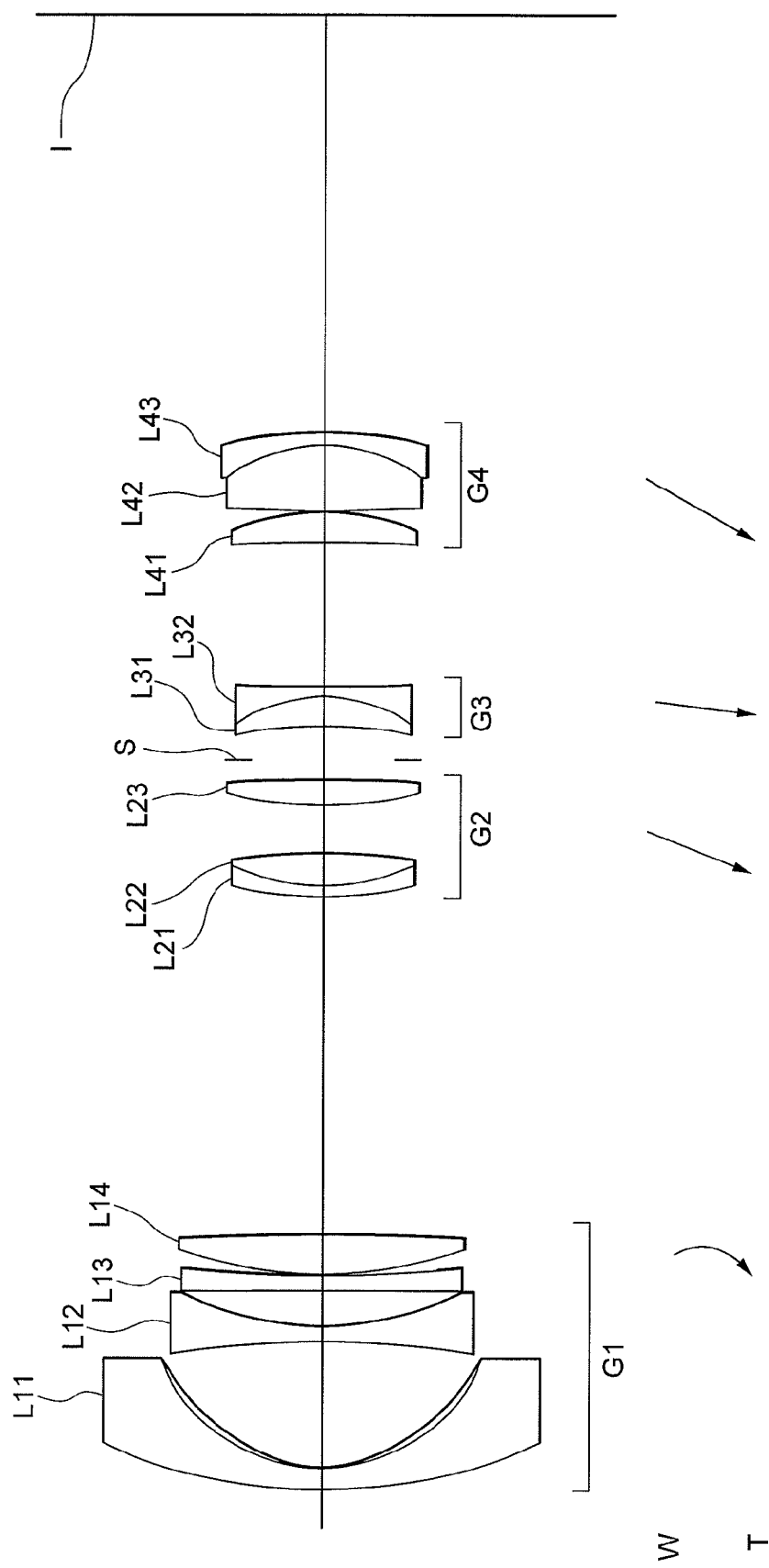

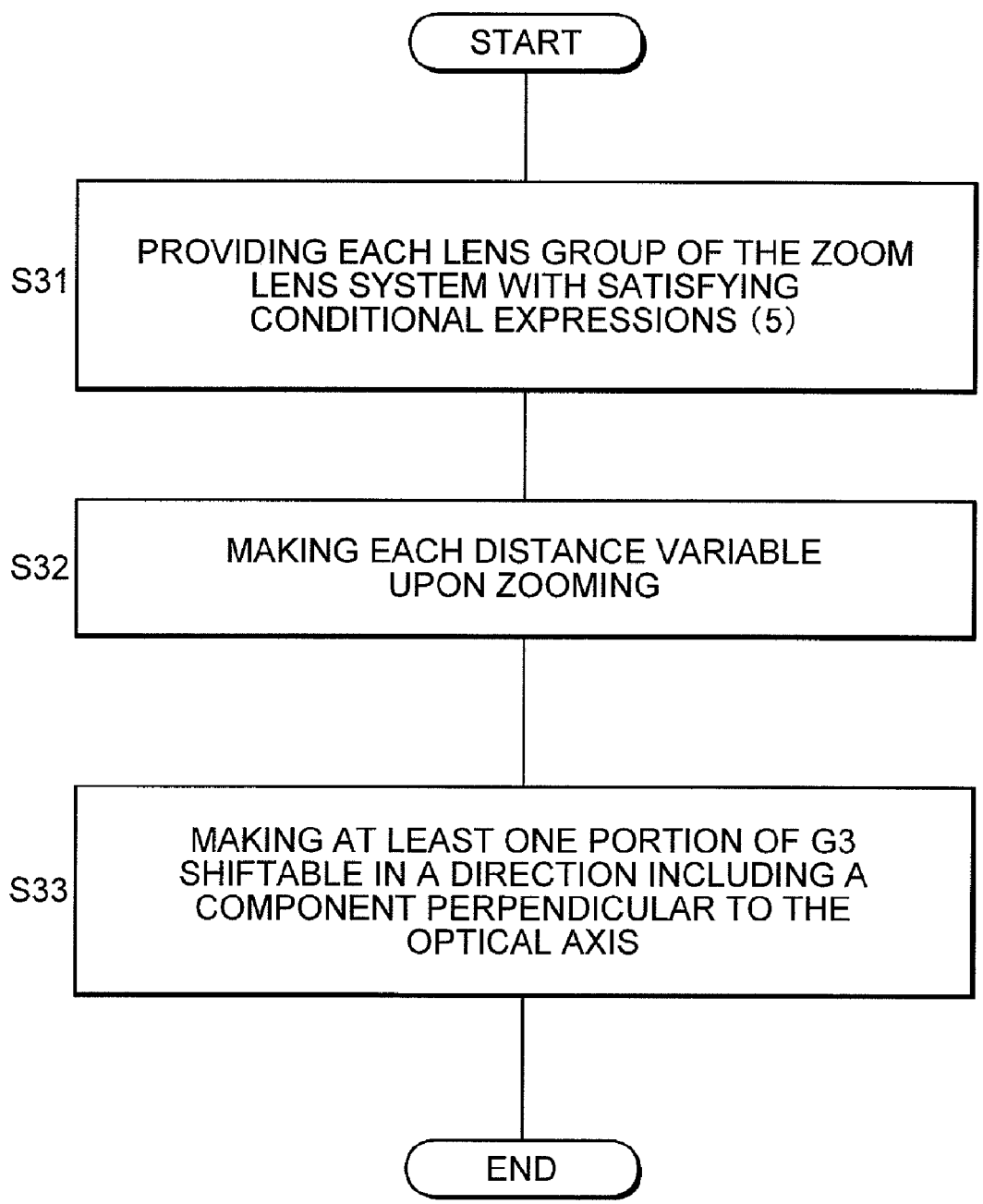

ZOOM LENS SYSTEM, IMAGING APPARATUS, AND METHOD FOR MANUFACTURING ZOOM LENS SYSTEM

The disclosure of the following priority applications are herein incorporated by reference:

Japanese Patent Application No. 2009-014768 filed on Jan. 26, 2009;

Japanese Patent Application No. 2009-014770 filed on Jan. 26, 2009; and

Japanese Patent Application No. 2009-014771 filed on Jan. 26, 2009.

BACKGROUND OF THE INVENTION

1. Field of the Invention

The present invention relates to a zoom lens system, an imaging apparatus, and a method for manufacturing the zoom lens system.

2. Related Background Art

There has been proposed a zoom lens system suitable for a film camera, an electronic still camera and a video camera having a vibration reduction function such as Japanese Patent Application Laid-Open No. 11-231220.

However, the conventional zoom lens has had a low zoom ratio, so that it has not satisfactorily met a requirement to have a high zoom ratio.

SUMMARY OF THE INVENTION

The present invention is made in view of above described problems and has an object to provide a zoom lens system including a lens capable of shifting in a direction including a component perpendicular to the optical axis, and having a high zoom ratio with excellent optical performance, an imaging apparatus, and a method for manufacturing the zoom lens system.

According to a first aspect of the present invention, there is provided a zoom lens system comprising, in order from an object side: a first lens group having negative refractive power; a second lens group having positive refractive power; a third lens group having negative refractive power; a fourth lens group having positive refractive power; upon zooming from a wide-angle end state to a telephoto end state, each distance between adjacent lens groups varying, at least one portion of the third lens group shifting in a direction including a component perpendicular to an optical axis, the following conditional expressions (1) and (2) being satisfied:

$$0.60<|f1|/(fw \times ft)^{1/2}<0.78 \quad (1)$$

$$1.20<f2/(-f1)<1.80 \quad (2)$$

where f1 denotes a focal length of the first lens group, f2 denotes a focal length of the second lens group, fw denotes a focal length of the zoom lens system in the wide-angle end state, and ft denotes a focal length of the zoom lens system in the telephoto end state.

In the first aspect of the present invention, it is preferable that the first lens group has at least two lenses that satisfy the following conditional expression (3):

$$1.750<n1<2.500 \quad (3)$$

where n1 denotes a refractive index of a lens in the first lens group at d-line, in which the wavelength λ=587.6 nm.

In the first aspect of the present invention, it is preferable that the following conditional expression (4) is satisfied:

$$1.80<f3/f1<2.50 \quad (4)$$

where f1 denotes a focal length of the first lens group, and f3 denotes a focal length of the third lens group.

In the first aspect of the present invention, it is preferable that the following conditional expression (5) is satisfied:

$$0.50<(Dt-Dw)/fw<1.50 \quad (5)$$

where Dt denotes a distance along the optical axis between the most object side lens surface of the zoom lens system and an image plane in the telephoto end state, Dw denotes a distance along the optical axis between the most object side lens surface of the zoom lens system and an image plane in the wide-angle end state, and fw denotes a focal length of the zoom lens system in the wide-angle end state.

In the first aspect of the present invention, it is preferable that the following conditional expression (6) is satisfied:

$$0.60<(Dt-Dw)/Y\max<1.60 \quad (6)$$

where Dt denotes a distance along the optical axis between the most object side lens surface of the zoom lens system and an image plane in the telephoto end state, Dw denotes a distance along the optical axis between the most object side lens surface of the zoom lens system and an image plane in the wide-angle end state, and Ymax denotes the maximum image height.

In the first aspect of the present invention, it is preferable that the following conditional expression (7) is satisfied:

$$400<|RA \times f1|<1300 \quad (7)$$

where RA denotes a radius of curvature of the most object side lens surface in the zoom lens system in mm, and f1 denotes a focal length of the first lens group in mm.

In the first aspect of the present invention, it is preferable that the first lens group has a negative lens locating to the most object side, and the following conditional expression (8) is satisfied:

$$1.40<f11/f1<2.10 \quad (8)$$

where f1 denotes a focal length of the first lens group, and f11 denotes a focal length of the negative lens locating to the most object side in the first lens group.

In the first aspect of the present invention, it is preferable that the following conditional expression (9) is satisfied:

$$1.00<f4/f2<2.00 \quad (9)$$

where f2 denotes a focal length of the second lens group, and f4 denotes a focal length of the fourth lens group.

In the first aspect of the present invention, it is preferable that the following conditional expression (10) is satisfied:

$$0.80<f4/(-f3)<1.30 \quad (10)$$

where f3 denotes a focal length of the third lens group, and f4 denotes a focal length of the fourth lens group.

In the first aspect of the present invention, it is preferable that an aperture stop is disposed between the second lens group and the fourth lens group.

In the first aspect of the present invention, it is preferable that the third lens group includes at least one cemented lens.

In the first aspect of the present invention, it is preferable that the first lens group is composed of at least two negative lenses and at least one positive lens.

In the first aspect of the present invention, it is preferable that the first lens group includes an aspherical lens.

In the first aspect of the present invention, it is preferable that upon zooming from the wide-angle end state to the telephoto end state, the second lens group and the fourth lens group are moved in a body.

In the first aspect of the present invention, it is preferable that upon zooming from the wide-angle end state to the telephoto end state, a distance between the second lens group and the third lens group increases, and a distance between the third lens group and the fourth lens group decrease.

According to a second aspect of the present invention, there is provided an imaging apparatus equipped with the zoom lens system according to the first aspect.

According to a third aspect of the present invention, there is provided a zoom lens system comprising, in order from an object side: a first lens group having negative refractive power; a second lens group having positive refractive power; a third lens group having negative refractive power; and a fourth lens group having positive refractive power; upon zooming from a wide-angle end state to a telephoto end state, each distance between adjacent lens groups varying, at least one portion of the third lens group shifting in a direction including a component perpendicular to an optical axis, the following conditional expressions (1) and (3) being satisfied:

$$0.60 < |f1|/(fw \times ft)^{1/2} < 0.78 \quad (1)$$

$$1.750 < n1 < 2.500 \quad (3)$$

where f1 denotes a focal length of the first lens group, fw denotes a focal length of the zoom lens system in the wide-angle end state, ft denotes a focal length of the zoom lens system in the telephoto end state, and n1 denotes a refractive index of a lens in the first lens group at d-line, in which the wavelength $\lambda=587.6$ nm.

According to a fourth aspect of the present invention, there is provided a zoom lens system comprising, in order from an object side: a first lens group having negative refractive power; a second lens group having positive refractive power; a third lens group having negative refractive power; and a fourth lens group having positive refractive power; the third lens group having a cemented negative lens; upon zooming from a wide-angle end state to a telephoto end state, each distance between adjacent lens groups varying, at least one portion of the third lens group shifting in a direction including a component perpendicular to an optical axis, and the following conditional expressions (1) and (4) being satisfied:

$$0.60 < |f1|/(fw \times ft)^{1/2} < 0.78 \quad (1)$$

$$1.80 < f3/f1 < 2.50 \quad (4)$$

where f1 denotes a focal length of the first lens group, f3 denotes a focal length of the third lens group, fw denotes a focal length of the zoom lens system in the wide-angle end state, and ft denotes a focal length of the zoom lens system in the telephoto end state.

According to a fifth aspect of the present invention, there is provided a zoom lens system comprising, in order from an object side: a first lens group having negative refractive power; a second lens group having positive refractive power; a third lens group having negative refractive power; and a fourth lens group having positive refractive power; upon zooming from a wide-angle end state to a telephoto end state, each distance between adjacent lens groups varying, at least one portion of the third lens group shifting in a direction including a component perpendicular to an optical axis, and the following conditional expression (5) being satisfied:

$$0.50 < (Dt-Dw)/fw < 1.50 \quad (5)$$

where Dt denotes a distance along the optical axis between the most object side lens surface of the zoom lens system and an image plane in the telephoto end state, Dw denotes a distance along the optical axis between the most object side lens surface of the zoom lens system and an image plane in the wide-angle end state, and fw denotes a focal length of the zoom lens system in the wide-angle end state.

According to a sixth aspect of the present invention, there is provided a method for manufacturing a zoom lens system that includes, in order from an object side, a first lens group having negative refractive power, a second lens group having positive refractive power, a third lens group having negative refractive power, and a fourth lens group having positive refractive power, the method comprising steps of: providing and disposing each lens group satisfying the following conditional expressions (1) and (2):

$$0.60 < |f1|/(fw \times ft)^{1/2} < 0.78 \quad (1)$$

$$1.20 < f2/(-f1) < 1.80 \quad (2)$$

where f1 denotes a focal length of the first lens group, f2 denotes a focal length of the second lens group, fw denotes a focal length of the zoom lens system in the wide-angle end state, and ft denotes a focal length of the zoom lens system in the telephoto end state; making each distance between adjacent lens groups variable upon zooming from a wide-angle end state to a telephoto end state; and making at least one portion of the third lens group shiftable in a direction including a component perpendicular to the optical axis.

In the sixth aspect of the present invention, the following step is preferably included:
providing the first lens group having at least two lenses that satisfy the following conditional expression (3):

$$1.750 < n1 < 2.500 \quad (3)$$

where n1 denotes a refractive index of a lens in the first lens group at d-line, in which the wavelength $\lambda=587.6$ nm.

In the sixth aspect of the present invention, the following step is preferably included:
satisfying the following conditional expression (4):

$$1.80 < f3/f1 < 2.50 \quad (4)$$

where f1 denotes a focal length of the first lens group, and f3 denotes a focal length of the third lens group.

In the sixth aspect of the present invention, the following step is preferably included:
satisfying the following conditional expression (5):

$$0.50 < (Dt-Dw)/fw < 1.50 \quad (5)$$

where Dt denotes a distance along the optical axis between the most object side lens surface of the zoom lens system and an image plane in the telephoto end state, Dw denotes a distance along the optical axis between the most object side lens surface of the zoom lens system and an image plane in the wide-angle end state, and fw denotes a focal length of the zoom lens system in the wide-angle end state.

According to a seventh aspect of the present invention, there is provided a method for manufacturing a zoom lens system that includes, in order from an object side, a first lens group having negative refractive power, a second lens group having positive refractive power, a third lens group having negative refractive power, and a fourth lens group having positive refractive power, the method comprising steps of: providing a cemented negative lens in the third lens group; providing and disposing each lens group satisfying the following conditional expressions (1) and (4):

$$0.60 < |f1|/(fw \times ft)^{1/2} < 0.78 \quad (1)$$

$$1.80 < f3/f1 < 2.50 \quad (4)$$

where f1 denotes a focal length of the first lens group, f3 denotes a focal length of the third lens group, fw denotes a focal length of the zoom lens system in the wide-angle end state, and ft denotes a focal length of the zoom lens system in the telephoto end state; making each distance between adjacent lens groups variable upon zooming from a wide-angle end state to a telephoto end state; and making at least one portion of the third lens group shiftable in a direction including a component perpendicular to the optical axis.

According to an eighth aspect of the present invention, there is provided a method for manufacturing a zoom lens system that includes, in order from an object side, a first lens group having negative refractive power, a second lens group having positive refractive power, a third lens group having negative refractive power, and a fourth lens group having positive refractive power, the method comprising steps of: providing and disposing each lens group satisfying the following conditional expression (5):

$$0.50 < (Dt-Dw)/fw < 1.50 \quad (5)$$

where Dt denotes a distance along the optical axis between the most object side lens surface of the zoom lens system and an image plane in the telephoto end state, Dw denotes a distance along the optical axis between the most object side lens surface of the zoom lens system and an image plane in the wide-angle end state, and fw denotes a focal length of the zoom lens system in the wide-angle end state; making each distance between adjacent lens groups variable upon zooming from a wide-angle end state to a telephoto end state; and making at least one portion of the third lens group shiftable in a direction including a component perpendicular to the optical axis.

The present invention makes it possible to provide a zoom lens system including a lens capable of shifting in a direction including a component perpendicular to the optical axis, an imaging apparatus, and a method for manufacturing the zoom lens system.

BRIEF DESCRIPTION OF THE DRAWINGS

FIG. 1 is a sectional view showing a lens configuration of a zoom lens system in a wide-angle end state according to Example 1 of the present application.

FIG. 9 is a sectional view showing a lens configuration of a zoom lens system in the wide-angle end state according to Example 3 of the present application.

FIG. 20 is a flowchart showing a method for manufacturing the zoom lens system seen from still another point of view according to the present application.

DESCRIPTION OF THE MOST PREFERRED EMBODIMENT

Figure 2A:
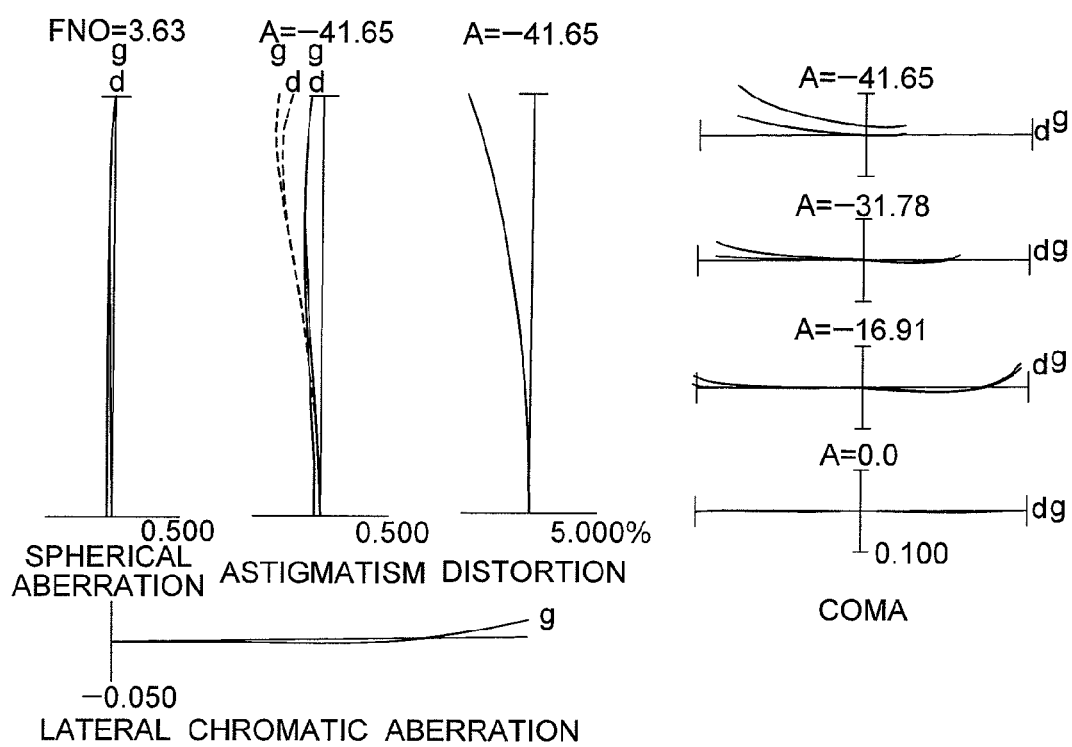
FIGS. 2A, and 2B are graphs showing various aberrations in the wide-angle end state of the zoom lens system according to Example 1, and coma upon shifting.

A zoom lens system, an imaging apparatus, and a method for manufacturing the zoom lens system according to the present application are explained below.

A zoom lens system according to the present application includes, in order from an object side, a first lens group having negative refractive power, a second lens group having positive refractive power, a third lens group having negative refractive power, and a fourth lens group having positive refractive power. Upon zooming from a wide-angle end state to a telephoto end state, each distance between adjacent lens groups varies. At least one portion of the third lens group shifts in a direction including a component perpendicular to an optical axis. The following conditional expressions (1) and (2) are satisfied:

$$0.60 < |f1|/(fw \times ft)^{1/2} < 0.78 \quad (1)$$

$$1.20 < f2/(-f1) < 1.80 \quad (2)$$

where f1 denotes a focal length of the first lens group, f2 denotes a focal length of the second lens group, fw denotes a focal length of the zoom lens system in the wide-angle end state, and ft denotes a focal length of the zoom lens system in the telephoto end state.

Conditional expression (1) is for setting refractive power of the first lens group, and with satisfying the conditional expression, the zoom lens system according to the present application makes it possible to keep excellent optical performance.

When the value $|f1|/(fw \times ft)^{1/2}$ is equal to or falls below the lower limit of conditional expression (1), refractive power of the first lens group becomes excessively large, so that it becomes impossible to excellently correct spherical aberration. In order to secure the effect of the present invention, it is preferable to set the lower limit of conditional expression (1) to 0.65.

On the other hand, when the value $|f1|/(fw \times ft)^{1/2}$ is equal to or exceeds the upper limit of conditional expression (1), refractive power of the first lens group becomes too small to realize a high zoom ratio. In order to secure the effect of the present invention, it is preferable to set the upper limit of conditional expression (1) to 0.76.

Conditional expression (2) is for setting refractive power of the first lens group and the second lens group. With satisfying the expression, it becomes possible to secure excellent optical performance with effectively securing a prescribed zoom ratio even when at least one portion of the third lens group is shifted in a direction including a component perpendicular to the optical axis (herein after simply called "upon shifting").

When the ratio f2/(−f1) is equal to or falls below the lower limit of conditional expression (2), refractive power of the first lens group becomes excessively small, so that it becomes impossible to realize a high zoom ratio, or coma becomes worse upon shifting. In order to secure the effect of the present invention, it is preferable to set the lower limit of conditional expression (2) to 1.25.

On the other hand, when the ratio f2/(−f1) is equal to or exceeds the upper limit of conditional expression (2), refractive power of the first lens group becomes excessively large, so that it becomes impossible to excellently correct variation in spherical aberration upon zooming. In order to secure the effect of the present invention, it is preferable to set the upper limit of conditional expression (2) to 1.60. In order to heighten the effect of the present invention, it is most preferable to set the upper limit of conditional expression (2) to 1.50.

With shifting at least one portion of the third lens group in a direction including a component perpendicular to the optical axis, it becomes possible to carry out an image correction upon generating an image blur caused by a shake.

With this configuration, a zoom lens system having a high zoom ratio and excellent optical performance can be realized.

In a zoom lens system according to the present application, the first lens group preferably includes at least two lenses satisfying the following conditional expression (3):

$$1.750 < n1 < 2.500 \quad (3)$$

where n1 denotes a refractive index at d-line, in which a wavelength λ=587.6 nm, of a lens in the first lens group.

Conditional expression (3) is for setting refractive power of lenses in the first lens group, and with satisfying this expression, a zoom lens system according to the present application can secure excellent optical performance.

When the value n1 is equal to or falls below the lower limit of conditional expression (3), a radius of curvature of each lens in the first lens group becomes small, so that it becomes impossible to excellently correct spherical aberration, curvature of field and coma. In order to secure the effect of the present invention, it is preferable to set the lower limit of conditional expression (3) to 1.770. In order to further secure the effect of the present invention, it is most preferable to set the lower limit of conditional expression (3) to 1.785.

On the other hand, when the value n1 is equal to or exceeds the upper limit of conditional expression (3), transmittance of short wavelength light in visible wavelength range becomes low resulting in taking on color, so that it is undesirable. In order to secure the effect of the present invention, it is preferable to set the upper limit of conditional expression (3) to 2.250. In order to further secure the effect of the present invention, it is most preferable to set the upper limit of conditional expression (3) to 2.150. In order to further secure the effect of the present invention, it is most preferable to set the upper limit of conditional expression (3) to 2.000.

A zoom lens system according to the present application preferably satisfies the following conditional expression (4):

$$1.80 < f3/f1 < 2.50 \quad (4)$$

where f1 denotes a focal length of the first lens group, and f3 denotes a focal length of the third lens group.

Conditional expression (4) is for setting refractive power of the first lens group and the third lens group. With satisfying this expression, it becomes possible to realize excellent optical performance with effectively securing a given zoom ratio even upon shifting.

When the ratio f3/f1 is equal to or falls below the lower limit of conditional expression (4), refractive power of the first lens group becomes excessively large, so that it becomes impossible to excellently correct variation in spherical aberration upon zooming. In order to secure the effect of the present invention, it is preferable to set the lower limit of conditional expression (4) to 1.82.

On the other hand, when the ratio f3/f1 is equal to or exceeds the upper limit of conditional expression (4), refractive power of the first lens group becomes excessively small, so that it becomes impossible to realize a high zoom ratio. In order to secure the effect of the present invention, it is preferable to set the upper limit of conditional expression (4) to 2.20.

A zoom lens system according to the present application preferably satisfies the following conditional expression (5):

$$0.50 < (Dt - Dw)/fw < 1.50 \quad (5)$$

where Dt denotes a distance along the optical axis between the most object side lens surface of the zoom lens system and the image plane in the telephoto end state, Dw denotes a distance along the optical axis between the most object side lens surface of the zoom lens system and the image plane in the wide-angle end state, and fw denotes a focal length of the zoom lens system in the wide-angle end state.

Conditional expression (5) is for setting a distance between the most object side lens surface of the zoom lens system and the image plane, and with satisfying this expression, it becomes possible to realize a high zoom ratio with securing excellent optical performance.

When the value (Dt−Dw)/fw is equal to or falls below the lower limit of conditional expression (5), it becomes impossible to excellently correct variation in curvature of field. In order to secure the effect of the present invention, it is preferable to set the lower limit of conditional expression (5) to 0.70.

On the other hand, when the value (Dt−Dw)/fw is equal to or exceeds the upper limit of conditional expression (5), the total lens length of the zoom lens system in the telephoto end state becomes excessively long. In order to secure the effect of the present invention, it is preferable to set the upper limit of conditional expression (5) to 1.30.

A zoom lens system according to the present application preferably satisfies the following conditional expression (6):

$$0.60 < (Dt - Dw)/Ymax < 1.60 \quad (6)$$

where Dt denotes a distance along the optical axis between the most object side lens surface of the zoom lens system and the image plane in the telephoto end state, Dw denotes a distance along the optical axis between the most object side lens surface of the zoom lens system and the image plane in the wide-angle end state, and Ymax denotes the maximum image height.

Conditional expression (6) is for setting a distance between the most object side lens surface of the zoom lens system and the image plane, and with satisfying this expression, it becomes possible to realize a high zoom ratio with securing excellent optical performance.

When the value (Dt−Dw)/Ymax is equal to or falls below the lower limit of conditional expression (6), it becomes impossible to excellently correct curvature of field upon zooming. In order to secure the effect of the present invention, it is preferable to set the lower limit of conditional expression (6) to 0.80.

On the other hand, when the value (Dt−Dw)/Ymax is equal to or exceeds the upper limit of conditional expression (6), the total lens length of the zoom lens system in the telephoto end state becomes excessively large. In order to secure the effect of the present invention, it is preferable to set the upper limit of conditional expression (6) to 1.40.

A zoom lens system according to the present application preferably satisfies the following conditional expression (7):

$$400<|RA \times f1|<1300 \tag{7}$$

where RA denotes a radius of curvature of the most object side lens surface of the zoom lens system, and f1 denotes a focal length of the first lens group.

Conditional expression (7) is for setting a radius of curvature of the most object side lens surface of the zoom lens system and a focal length of the first lens group, and with satisfying this expression, it becomes possible to secure excellent optical performance.

When the value |RA×f1| is equal to or falls below the lower limit of conditional expression (7), the radius of curvature of the most object side lens surface becomes too small, or refractive power of the first lens group becomes too large, so that it becomes impossible to excellently correct variation in curvature of field upon zooming. In order to secure the effect of the present invention, it is preferable to set the lower limit of conditional expression (7) to 550.

On the other hand, when the value |RA×f1| is equal to or exceeds the upper limit of conditional expression (7), the radius of curvature of the most object side lens surface becomes excessively large, or refractive power of the first lens group becomes excessively small, so that it becomes impossible to excellently correct coma, or it becomes impossible to realize a high zoom ratio. In order to secure the effect of the present invention, it is preferable to set the upper limit of conditional expression (7) to 1100.

In a zoom lens system according to the present application, the first lens group includes a negative lens locating to the most object side, and the following conditional expression (8) is preferably satisfied:

$$1.40<f11/f1<2.10 \tag{8}$$

where f1 denotes a focal length of the first lens group, and f11 denotes a focal length of the negative lens in the first lens group.

Conditional expression (8) is for setting the focal length of the negative lens locating to the most object side of the first lens group, and the focal length of the first lens group, and with satisfying the expression, it becomes possible to secure excellent optical performance.

When the ratio f11/f1 is equal to or falls below the lower limit of conditional expression (8), refractive power of the negative lens locating to the most object side in the first lens group becomes too large, so that it becomes impossible to excellently correct coma. In order to secure the effect of the present invention, it is preferable to set the lower limit of conditional expression (8) to 1.50.

On the other hand, when the ratio f11/f1 is equal to or exceeds the upper limit of conditional expression (8), refractive power of the negative lens locating to the most object side of the first lens group becomes too small, so that the outer diameter of the lens becomes large. Moreover, it becomes impossible to excellently correct spherical aberration. In order to secure the effect of the present invention, it is preferable to set the upper limit of conditional expression (8) to 2.00.

A zoom lens system according to the present application preferably satisfies the following conditional expression (9):

$$1.00<f4/f2<2.00 \tag{9}$$

where f2 denotes a focal length of the second lens group, and f4 denotes a focal length of the fourth lens group.

Conditional expression (9) is for setting refractive power of the second lens group and the fourth lens group, and with securing the expression, it becomes possible to secure excellent optical performance, and to realize excellent optical performance even upon shifting.

When the ratio f4/f2 is equal to or falls below the lower limit of conditional expression (9), refractive power of the fourth lens group becomes excessively large, so that coma upon shifting becomes worse. In order to secure the effect of the present invention, it is preferable to set the lower limit of conditional expression (9) to 1.20.

On the other hand, when the ratio f4/f2 is equal to or exceeds the upper limit of conditional expression (9), refractive power of the fourth lens group becomes excessively small, so that coma upon shifting becomes worse. In order to secure the effect of the present invention, it is preferable to set the upper limit of conditional expression (9) to 1.80.

A zoom lens system according to the present application preferably satisfies the following conditional expression (10):

$$0.80<f4/(-f3)<1.30 \tag{10}$$

where f3 denotes a focal length of the third lens group, and f4 denotes a focal length of the fourth lens group.

Conditional expression (10) is for setting refractive power of the third lens group and the fourth lens group. With satisfying the expression, it becomes possible to secure excellent optical performance, and to realize excellent optical performance even upon shifting.

When the ratio f4/(−f3) is equal to or falls below the lower limit of conditional expression (10), refractive power of the fourth lens group becomes excessively large, so that coma upon shifting becomes worse. In order to secure the effect of the present invention, it is preferable to set the lower limit of conditional expression (10) to 0.90.

On the other hand, when the ratio f4/(−f3) is equal to or exceeds the upper limit of conditional expression (10), refractive power of the fourth lens group becomes excessively small, so that coma upon shifting becomes worse. In order to secure the effect of the present invention, it is preferable to set the upper limit of conditional expression (10) to 1.20.

In a zoom lens system according to the present application, an aperture stop is preferably provided between the second lens group and the fourth lens group.

With this configuration, the zoom lens system according to the present application makes it possible to excellently correct off-axis coma upon zooming, so that excellent optical performance can be obtained.

In a zoom lens system according to the present application, the third lens group preferably includes at least one cemented lens.

With this lens configuration, the zoom lens system according to the present application makes it possible to excellently secure chromatic aberration upon shifting.

In a zoom lens system according to the present application, the first lens group is preferably composed of at least two negative lenses and at least one positive lens.

With this configuration, the zoom lens system according to the present application makes it possible to excellently correct variation in off-axis chromatic aberration upon zooming.

In a zoom lens system according to the present application, the first lens group preferably includes an aspherical lens.

With this configuration, the zoom lens system according to the present application makes it possible to excellently correct distortion.

In a zoom lens system according to the present application, the second lens group and the fourth lens group is preferably moved in a body upon zooming from a wide-angle end state to a telephoto end state.

With this configuration, the zoom lens system according to the present application makes it possible to excellently correct curvature of field upon zooming.

In a zoom lens system according to the present application, it is preferable that upon zooming from the wide-angle end state to the telephoto end state, a distance between the second lens group and the third lens group increases, and a distance between the third lens group and the fourth lens group decreases.

With this configuration, the zoom lens system according to the present application makes it possible to reduce a diameter of the first lens group and makes it easy to increase the zoom ratio. Moreover, spherical aberration in the telephoto end state can be excellently corrected.

An imaging apparatus according to the present application is characterized by including the zoom lens system according to the present application.

With this construction, it becomes possible to realize an imaging apparatus equipped with a high zoom ratio and excellent optical performance with a lens capable of shifting in a direction including a component perpendicular to the optical axis.

A method for manufacturing a zoom lens system according to the present application including, in order from an object side, a first lens group having negative refractive power, a second lens group having positive refractive power, a third lens group having negative refractive power, and a fourth lens group having positive refractive power, the method comprising steps of: providing the first lens group having negative refractive power, the second lens group having positive refractive power, the third lens group having negative refractive power, and the fourth lens group having positive refractive power such that the first and second lens groups satisfy the following conditional expressions (1) and (2); making each distance between adjacent lens groups variable upon zooming from a wide-angle end state to a telephoto end state; and making at least one portion of the third lens group shiftable in a direction including a component perpendicular to the optical axis:

$$0.60 < |f1|/(fw \times ft)^{1/2} < 0.78 \quad (1)$$

$$1.20 < f2/(-f1) < 1.80 \quad (2)$$

where f1 denotes a focal length of the first lens group, f2 denotes a focal length of the second lens group, fw denotes a focal length of the zoom lens system in the wide-angle end state, and ft denotes a focal length of the zoom lens system in the telephoto end state.

With this configuration, it becomes possible to manufacture a zoom lens system equipped with a high zoom ratio and excellent optical performance with a lens capable of shifting in a direction including a component perpendicular to the optical axis.

Then, a zoom lens system, an imaging apparatus, and a method for manufacturing the zoom lens system seen from another point of view according to the present application are explained.

A zoom lens system seen from another point of view according to the present application includes, in order from an object side, a first lens group having negative refractive power, a second lens group having positive refractive power, a third lens group having negative refractive power, and a fourth lens group having positive refractive power. The third lens group includes a cemented negative lens. Upon zooming from a wide-angle end state to a telephoto end state, each distance between adjacent lens groups varies. At least one portion of the third lens group shifts in a direction including a component perpendicular to the optical axis. The following conditional expressions (1) and (4) are satisfied:

$$0.60 < |f1|/(fw \times ft)^{1/2} < 0.78 \quad (1)$$

$$1.80 < f3/f1 < 2.50 \quad (4)$$

where f1 denotes a focal length of the first lens group, f3 denotes a focal length of the third lens group, fw denotes a focal length of the zoom lens system in the wide-angle end state, and ft denotes a focal length of the zoom lens system in the telephoto end state.

Conditional expression (1) is for setting refractive power of the first lens group. However, conditional expression (1) has already been explained, so that duplicated explanations are omitted.

Conditional expression (4) is for setting refractive power of the first lens group and the third lens group. However, conditional expression (4) has already been explained, so that duplicated explanations are omitted.

An imaging apparatus seen from another point of view according to the present application is characterized by including the zoom lens system seen from another point of view according to the present application.

With this construction, it becomes possible to realize an imaging apparatus equipped with a high zoom ratio and excellent optical performance with a lens capable of shifting in a direction including a component perpendicular to the optical axis.

A method for manufacturing a zoom lens system seen from another point of view according to the present application including, in order from an object side, a first lens group having negative refractive power, a second lens group having positive refractive power, a third lens group having negative refractive power, and a fourth lens group having positive refractive power, the method comprising steps of: providing the first lens group having negative refractive power, the second lens group having positive refractive power, the third lens group having negative refractive power, and the fourth lens group having positive refractive power such that each lens group satisfies the following conditional expressions (1) and (4); providing a cemented negative lens in the third lens group; making each distance between adjacent lens groups variable upon zooming from the wide-angle end state to the telephoto end state; and making at least one portion of the third lens group shiftable in a direction including a component perpendicular to the optical axis:

$$0.60 < |f1|/(fw \times ft)^{1/2} < 0.78 \quad (1)$$

$$1.80 < f3/f1 < 2.50 \quad (4)$$

where f1 denotes a focal length of the first lens group, f3 denotes a focal length of the third lens group, fw denotes a focal length of the zoom lens system in the wide-angle end state, and ft denotes a focal length of the zoom lens system in the telephoto end state.

With this configuration, it becomes possible to manufacture a zoom lens system equipped with a high zoom ratio and excellent optical performance with a lens capable of shifting in a direction including a component perpendicular to the optical axis.

Then, a zoom lens system, an imaging apparatus, and a method for manufacturing the zoom lens system seen from still another point of view according to the present application is explained.

A zoom lens system seen from still another point of view according to the present application includes, in order from an object side, a first lens group having negative refractive power, a second lens group having positive refractive power, a third lens group having negative refractive power, and a fourth lens group having positive refractive power. Upon zooming from a wide-angle end state to a telephoto end state, each distance between adjacent lens groups varies. At least one portion of the third lens group shifts in a direction including a component perpendicular to the optical axis. The following conditional expression (5) is satisfied:

$$0.50<(Dt-Dw)/fw<1.50 \qquad (5)$$

where Dt denotes a distance along the optical axis between the most object side lens surface of the zoom lens system and the image plane in the telephoto end state, Dw denotes a distance along the optical axis between the most object side lens surface of the zoom lens system and the image plane in the wide-angle end state, and fw denotes a focal length of the zoom lens system in the wide-angle end state.

Conditional expression (5) is for setting a distance between the most object side lens surface of the zoom lens system and the image plane. However, conditional expression (5) has already been explained, so that duplicated explanations are omitted.

An imaging apparatus seen from still another point of view according to the present application is characterized by including the zoom lens system seen from still another point of view according to the present application.

With this construction, it becomes possible to realize an imaging apparatus equipped with a high zoom ratio and excellent optical performance with a lens capable of shifting in a direction including a component perpendicular to the optical axis.

A method for manufacturing a zoom lens system seen from still another point of view according to the present application including, in order from an object side, a first lens group having negative refractive power, a second lens group having positive refractive power, a third lens group having negative refractive power, and a fourth lens group having positive refractive power, the method comprising steps of: providing the first lens group having negative refractive power, the second lens group having positive refractive power, the third lens group having negative refractive power, and the fourth lens group having positive refractive power such that each lens group satisfies the following conditional expression (5); making each distance between adjacent lens groups variable upon zooming from the wide-angle end state to the telephoto end state; and making at least one portion of the third lens group shiftable in a direction including a component perpendicular to the optical axis:

$$0.50<(Dt-Dw)/fw<1.50 \qquad (5)$$

where Dt denotes a distance along the optical axis between the most object side lens surface of the zoom lens system and the image plane in the telephoto end state, Dw denotes a distance along the optical axis between the most object side lens surface of the zoom lens system and the image plane in the wide-angle end state, and fw denotes a focal length of the zoom lens system in the wide-angle end state.

With this configuration, it becomes possible to manufacture a zoom lens system equipped with a high zoom ratio and excellent optical performance with a lens capable of shifting in a direction including a component perpendicular to the optical axis.

A zoom lens system according to each numerical example of the present invention is explained below with reference to accompanying drawings.

Example 1

FIG. 1 is a sectional view showing a lens configuration of a zoom lens system in a wide-angle end state according to Example 1 of the present application.

The zoom lens system according to Example 1 is composed of, in order from an object side, a first lens group G1 having negative refractive power, a second lens group G2 having positive refractive power, a third lens group G3 having negative refractive power, and a fourth lens group G4 having positive refractive power.

The first lens group G1 is composed of, in order from the object side, a negative meniscus lens L11 having a convex surface facing the object side, a double concave negative lens L12, and a positive meniscus lens L13 having a convex surface facing the object side. The negative meniscus lens L11 is an aspherical lens whose aspherical surface is formed on a resin layer applied on the image plane I side glass lens surface.

The second lens group G2 is composed of, in order from the object side, a cemented lens constructed by a negative meniscus lens L21 having a convex surface facing the object side cemented with a double convex positive lens L22, and a positive meniscus lens L23 having a convex surface facing the object side.

The third lens group G3 is composed of a cemented lens constructed by, in order from the object side, a positive meniscus lens L31 having a concave surface facing the object side cemented with a double concave negative lens L32.

The fourth lens group G4 is composed of, in order from the object side, a plano-convex positive lens L41 having a convex surface facing the image plane I side, and a cemented lens constructed by a double convex positive lens L42 cemented with a negative meniscus lens L43 having a convex surface facing the image plane I side.

In the zoom lens system according to Example 1, an aperture stop S is disposed between the second lens group G2 and the third lens group G3, and moved integrally with the third lens group G3 upon zooming from a wide-angle end state to a telephoto end state.

In the zoom lens system according to Example 1, upon zooming from the wide-angle end state to the telephoto end state, the first lens group G1 is at first moved to the image plane I side and then moved to the object side, in other words, zooming trajectory of the first lens group G1 has a convex shape facing the image plane I side, the second lens group G2, the third lens group G3 and the fourth lens group G4 are moved to the object side along the optical axis such that a distance between the second lens group G2 and the third lens group G3 increases, and a distance between the third lens group G3 and the fourth lens group G4 decreases. In this instance, the second lens group G2 and the fourth lens group G4 are moved in a body.

In the zoom lens system according to Example 1, the third lens group G3 shifts in a direction including a component perpendicular to the optical axis.

Various values associated with the zoom lens system according to Example 1 are listed in Table 1.

In [Specifications], W denotes a wide-angle end state, M denotes an intermediate focal length state, T denotes a telephoto end state, f denotes a focal length of the zoom lens system, FNO denotes an f-number, 2ω denotes an angle of view, and Y denotes an image height, TL denotes a total lens length, and Bf denotes a back focal length.

In [Lens Data], the left most column "i" shows the lens surface number counted in order from the object side, the second column "r" shows a radius of curvature of the lens surface, the third column "d" shows a distance to the next surface, the fourth column "nd" shows refractive index of the material at d-line (wavelength λ=587.6 nm), and the fifth column "vd" shows Abbe number of the material at d-line (wavelength λ=587.6 nm). In the fifth column "nd" refractive index of the air nd=1.000000 is omitted. In the second column "r", r=∞ denotes a plane surface. In the third column "d", Bf denotes back focal length.

In [Aspherical Surface Data], when "h" denotes a vertical height from the optical axis, X(h) denotes a sag amount which is a distance along the optical axis from the tangent surface at the vertex of the aspherical surface to the aspherical surface at the vertical height h from the optical axis, r denotes a radius of curvature of a reference sphere (paraxial radius of curvature), κ denotes a conical coefficient, and An denotes an aspherical coefficient of n-th order, the aspherical surface is exhibited by the following expression:

$$x = (h^2/r)/[1 + \{1 - \kappa \times (h/r)^2\}^{1/2}] + A4 \times h^4 + A6 \times h^6 + A8 \times h^8 + A10 \times h^{10}$$

In [Aspherical Surface Data], "E-n" denotes "×10$^{-n}$", in which "n" is an integer, and for example "1.234E-05" denotes "1.234×10$^{-5}$".

In [Variable Distances], di denotes a variable distance at the surface number i, and Bf denotes a back focal length.

In [Lens Group Data], a starting surface number "i" and a focal length of each lens group are shown.

In [Values for Conditional Expressions], values for respective conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples.

TABLE 1

[Specifications]
Zoom Ratio: 3.22

|   | W | M | T |
|---|---|---|---|
| f = | 16.5 | 32.8 | 53.3 |
| FNO = | 3.5 | 4.8 | 6.0 |
| 2ω = | 84.4 | 47.2 | 29.9 |
| Y = | 14.25 | 14.25 | 14.25 |

TABLE 1-continued

| TL = | 130.18 | 128.00 | 147.05 |
|---|---|---|---|
| Bf = | 38.29 | 57.79 | 84.31 |

[Lens Data]

| i | r | d | nd | vd |
|---|---|---|---|---|
| 1) | 33.333 | 1.90 | 1.79500 | 45.30 |
| 2) | 16.100 | 0.17 | 1.55389 | 38.09 |
| *3) | 13.600 | 10.60 | | |
| 4) | −102.031 | 1.50 | 1.72916 | 54.66 |
| 5) | 27.621 | 2.30 | | |
| 6) | 28.541 | 3.45 | 1.84666 | 23.78 |
| 7) | 82.554 | d7 | | |
| 8) | 27.300 | 0.90 | 1.80518 | 25.43 |
| 9) | 15.551 | 4.60 | 1.51823 | 58.89 |
| 10) | −37.422 | 0.10 | | |
| 11) | 25.246 | 2.45 | 1.51823 | 58.89 |
| 12) | 55.309 | d12 | | |
| 13) | ∞ | 2.90 | Aperture Stop S | |
| 14) | −32.302 | 2.75 | 1.85026 | 32.35 |
| 15) | −11.682 | 0.80 | 1.77250 | 49.61 |
| 16) | 161.664 | d16 | | |
| 17) | ∞ | 3.00 | 1.51823 | 58.89 |
| 18) | −23.681 | 0.10 | | |
| 19) | 114.651 | 5.00 | 1.49782 | 82.56 |
| 20) | −16.345 | 1.00 | 1.85026 | 32.35 |
| 21) | −46.453 | BF | | |

[Aspherical Surface Data]
Surface Number: 3

K = 1
A4 = 2.54910E−05
A6 = 5.94080E−08
A8 = −1.06500E−10
A10 = 7.27750E−13

[Variable Distances]

|   | W | M | T |
|---|---|---|---|
| d7 | 31.23 | 9.55 | 2.07 |
| d12 | 1.61 | 7.22 | 11.15 |
| d16 | 15.53 | 9.92 | 5.99 |
| BF | 38.29 | 57.79 | 84.31 |

[Lens Group Data]

| Group | i | focal length |
|---|---|---|
| 1 | 1 | −21.64 |
| 2 | 8 | 27.99 |
| 3 | 13 | −40.96 |
| 4 | 17 | 43.13 |

[Values for Conditional Expressions]

(1) |f1|/(fw × ft)$^{1/2}$ = 0.729
(2) f2/(−f1) = 1.29
(3) n1 = 1.79500, 1.84666
(4) f3/f1 = 1.89
(5) (Dt − Dw)/fw = 1.02
(6) (Dt − Dw)/Ymax = 1.18
(7) |RA × f1| = 721
(8) f11/f1 = 1.52
(9) f4/f2 = 1.54
(10) f4/(−f3) = 1.05

Figure 2B:
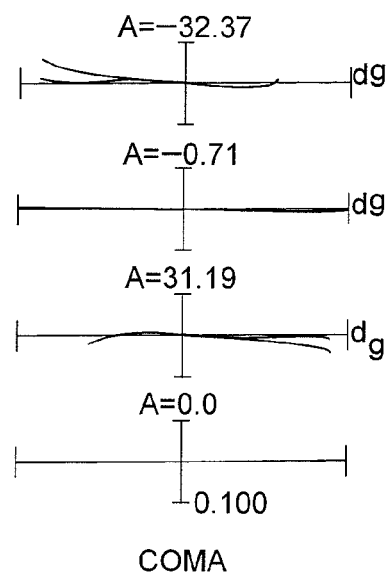
Figure 3:
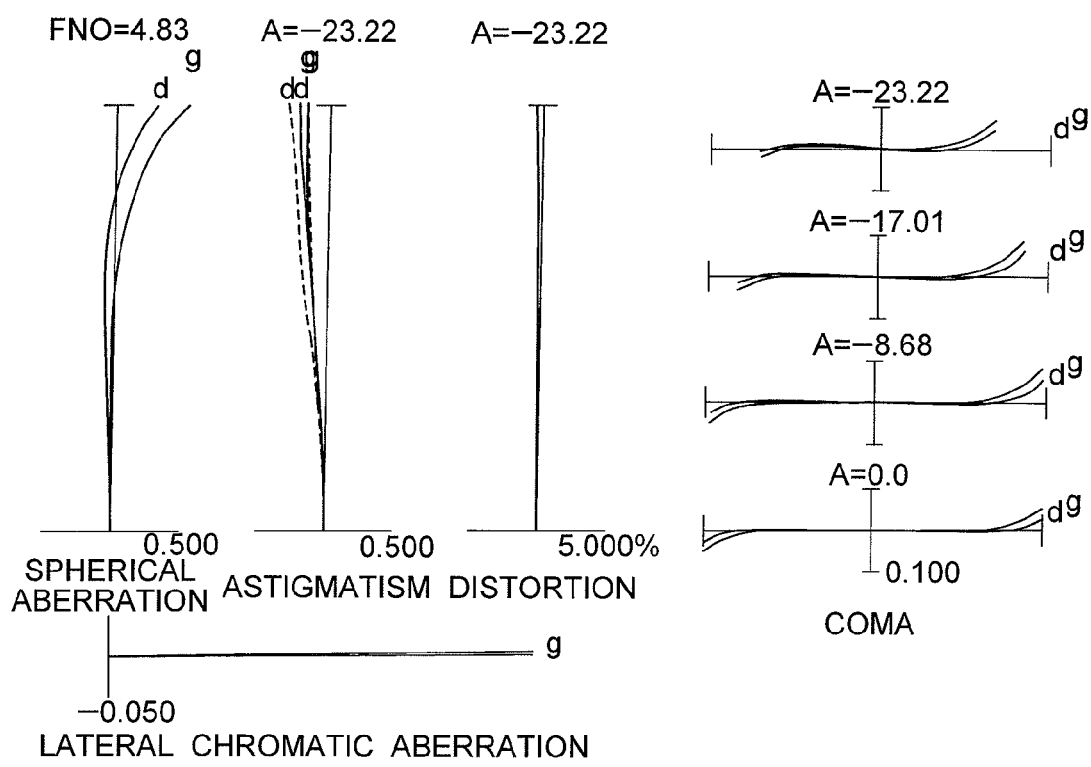
FIG. 3 shows various aberrations in an intermediate focal length state of the zoom lens system according to Example 1.
Figure 4A:
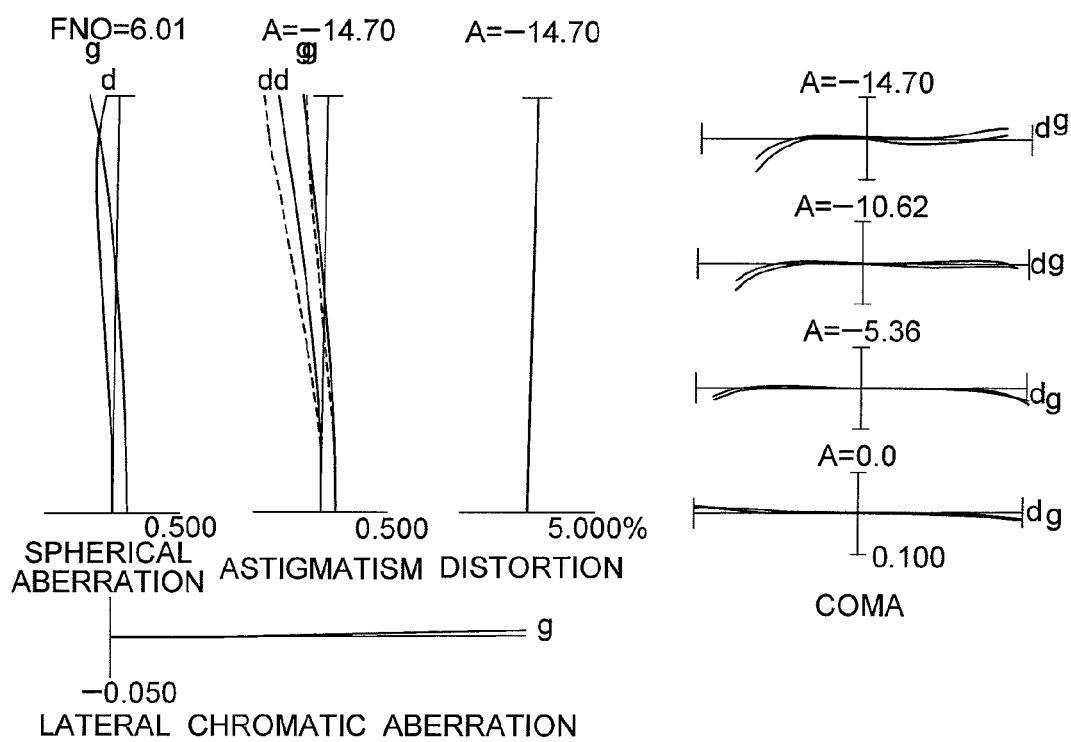
FIGS. 4A, and 4B are graphs showing various aberrations in a telephoto end state of the zoom lens system according to Example 1, and coma upon shifting.
Figure 4B:
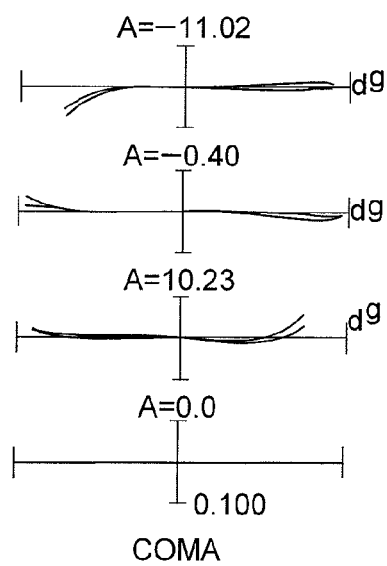

FIGS. 2A, and 2B are graphs showing various aberrations in the wide-angle end state of the zoom lens system according to Example 1, and coma upon shifting. FIG. 3 shows various aberrations in an intermediate focal length state of the zoom lens system according to Example 1. FIGS. 4A, and 4B are graphs showing various aberrations in a telephoto end state of the zoom lens system according to Example 1, and coma upon shifting.

In respective graphs from FIG. 2A to FIG. 4B, FNO denotes an f-number, A denotes a half angle of view. In graphs showing spherical aberration, f-number corresponding to the maximum aperture is shown. In graphs showing astigmatism and distortion, the maximum value of a half angle of view is shown. In graphs showing coma, each of a half angle of view is shown. In respective graphs, d denotes an aberration curve at d-line (wavelength λ=587.6 nm), and g denotes an aberration curve at g-line (wavelength λ=435.8 nm). In the graph showing astigmatism, a solid line indicates a sagittal image plane, and a broken line indicates a meridional image plane. The above-described explanation regarding various aberration graphs is the same as the other Examples.

As is apparent from FIG. 2A through 4B, the zoom lens system according to Example 1 shows superb optical performance as a result of good corrections to various aberrations in the wide-angle end state, in the intermediate focal length state, and in the telephoto end state, even upon shifting.

Example 2

Figure 5:
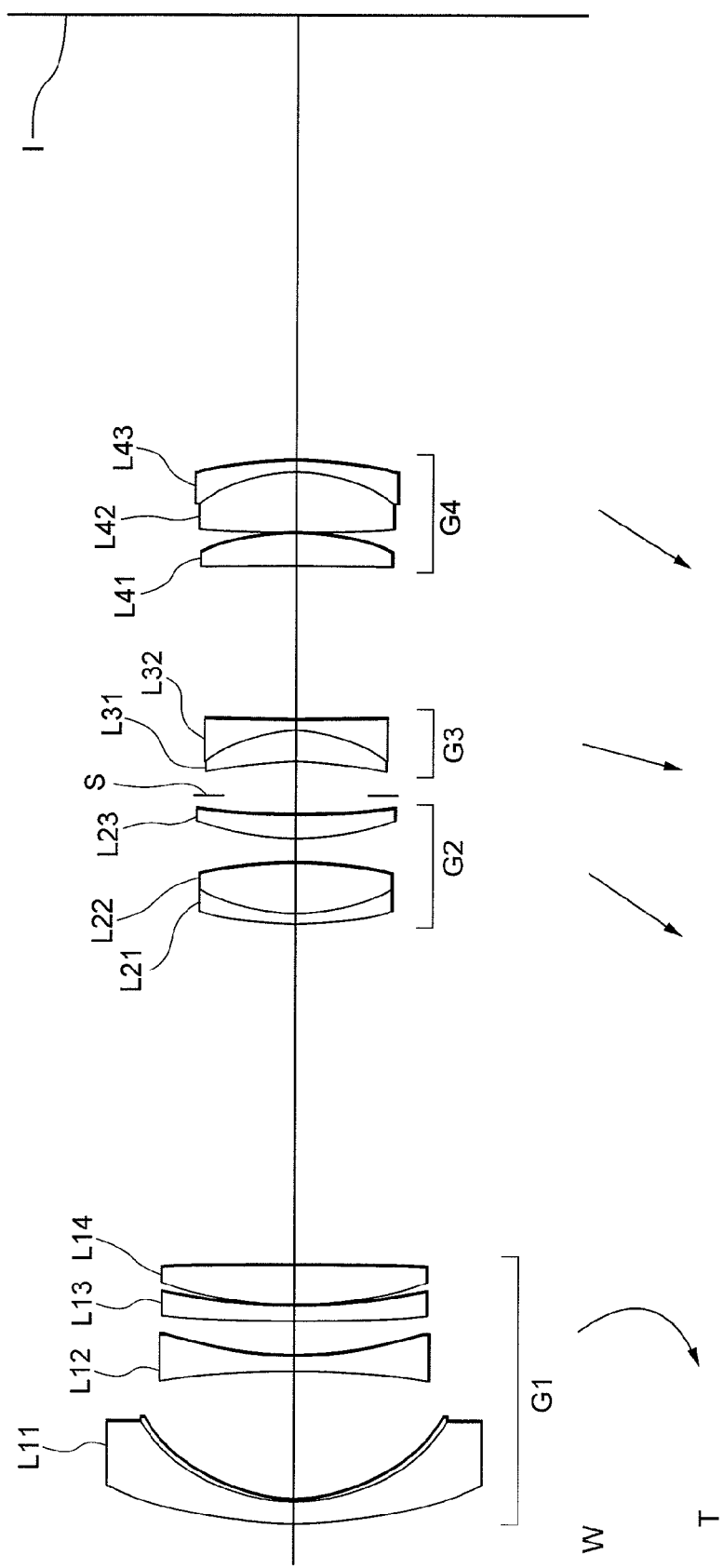
FIG. 5 is a sectional view showing a lens configuration of a zoom lens system in the wide-angle end state according to Example 2 of the present application.

FIG. 5 is a sectional view showing a lens configuration of a zoom lens system in the wide-angle end state according to Example 2 of the present application.

The zoom lens system according to Example 2 is composed of, in order from an object side, a first lens group G1 having negative refractive power, a second lens group G2 having positive refractive power, a third lens group G3 having negative refractive power, and a fourth lens group G4 having positive refractive power.

The first lens group G1 is composed of, in order from the object side, a negative meniscus lens L11 having a convex surface facing the object side, a double concave negative lens L12, a negative meniscus lens L13 having a convex surface facing the object side, and a positive meniscus lens L14 having a convex surface facing the object side. The negative meniscus lens L11 is an aspherical lens whose aspherical surface is formed on a resin layer applied on the image plane I side glass lens surface.

The second lens group G2 is composed of, in order from the object side, a cemented lens constructed by a negative meniscus lens L21 having a convex surface facing the object side cemented with a double convex positive lens L22, and a positive meniscus lens L23 having a convex surface facing the object side.

The third lens group G3 is composed of a cemented lens constructed by, in order from the object side, a positive meniscus lens L31 having a concave surface facing the object side cemented with a double concave negative lens L32.

The fourth lens group G4 is composed of, in order from the object side, a plano-convex positive lens L41 having a convex surface facing the image plane I side, and a cemented lens constructed by a double convex positive lens L42 cemented with a negative meniscus lens L43 having a convex surface facing the image plane I side.

In the zoom lens system according to Example 2, an aperture stop S is disposed between the second lens group G2 and the third lens group G3, and moved integrally with the third lens group G3 upon zooming from a wide-angle end state to a telephoto end state.

In the zoom lens system according to Example 2, upon zooming from the wide-angle end state to the telephoto end state, the first lens group G1 is at first moved to the image plane I side and then moved to the object side, in other words, zooming trajectory of the first lens group G1 has a convex shape facing the image plane I side, the second lens group G2, the third lens group G3 and the fourth lens group G4 are moved to the object side along the optical axis such that a distance between the second lens group G2 and the third lens group G3 increases, and a distance between the third lens group G3 and the fourth lens group G4 decreases. In this instance, the second lens group G2 and the fourth lens group G4 are moved in a body.

In the zoom lens system according to Example 2, the third lens group G3 shifts in a direction including a component perpendicular to the optical axis.

Various values associated with the zoom lens system according to Example 2 are listed in Table 2.

TABLE 2

[Specifications]
Zoom Ratio: 3.24

| | W | M | T |
|---|---|---|---|
| f = | 16.5 | 32.6 | 53.3 |
| FNO = | 3.7 | 4.8 | 5.9 |
| 2ω = | 84.6 | 47.4 | 29.9 |
| Y = | 14.25 | 14.25 | 14.25 |
| TL = | 130.85 | 128.70 | 148.00 |
| Bf = | 38.56 | 57.90 | 84.68 |

[Lens Data]

| i | r | d | nd | νd |
|---|---|---|---|---|
| 1) | 40.043 | 1.90 | 1.51680 | 64.12 |
| 2) | 16.100 | 0.17 | 1.55389 | 38.09 |
| *3) | 13.900 | 11.00 | | |
| 4) | −114.885 | 1.40 | 1.80400 | 46.58 |
| 5) | 32.203 | 3.00 | | |
| 6) | 123.629 | 1.28 | 1.80400 | 46.58 |
| 7) | 45.051 | 0.10 | | |
| 8) | 32.378 | 3.50 | 1.80518 | 25.43 |
| 9) | 838.071 | d9 | | |
| 10) | 31.539 | 0.90 | 1.75520 | 27.51 |
| 11) | 16.577 | 4.30 | 1.51680 | 64.12 |
| 12) | −44.059 | 2.16 | | |
| 13) | 21.883 | 2.10 | 1.51823 | 58.89 |
| 14) | 52.902 | d14 | | |
| 15) | ∞ | 2.90 | Aperture Stop S | |
| 16) | −36.742 | 2.75 | 1.85026 | 32.35 |
| 17) | −12.426 | 0.80 | 1.77250 | 49.61 |
| 18) | 104.520 | d18 | | |
| 19) | ∞ | 2.75 | 1.48749 | 70.45 |
| 20) | −23.444 | 0.10 | | |
| 21) | 116.161 | 5.26 | 1.49782 | 82.56 |
| 22) | −15.151 | 1.00 | 1.80100 | 34.96 |
| 23) | −41.509 | BF | | |

[Aspherical Surface Data]
Surface Number: 3

K = 1
A4 = 2.65560E−05
A6 = 5.94080E−08
A8 = −1.00010E−10
A10 = 9.63140E−13

[Variable Distances]

| | W | M | T |
|---|---|---|---|
| d9 | 29.65 | 8.16 | 0.69 |
| d14 | 1.69 | 7.40 | 11.23 |
| d18 | 13.58 | 7.87 | 4.04 |
| BF | 38.56 | 57.90 | 84.68 |

[Lens Group Data]

| Group | i | focal length |
|---|---|---|
| 1 | 1 | −21.90 |
| 2 | 10 | 29.17 |

TABLE 2-continued

| 3 | 15 | −41.04 |
| 4 | 19 | 41.07 |

[Values for Conditional Expressions]

Figure 6A:
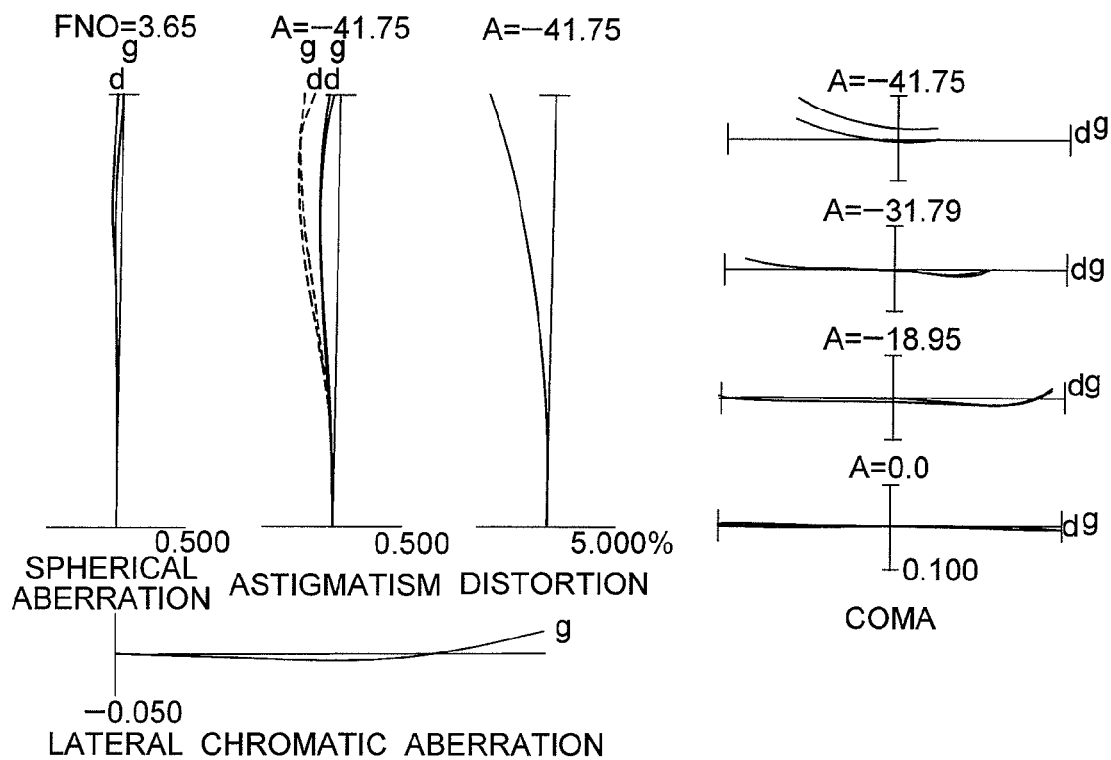
FIGS. 6A, and 6B are graphs showing various aberrations in the wide-angle end state of the zoom lens system according to Example 2, and coma upon shifting.
Figure 6B:
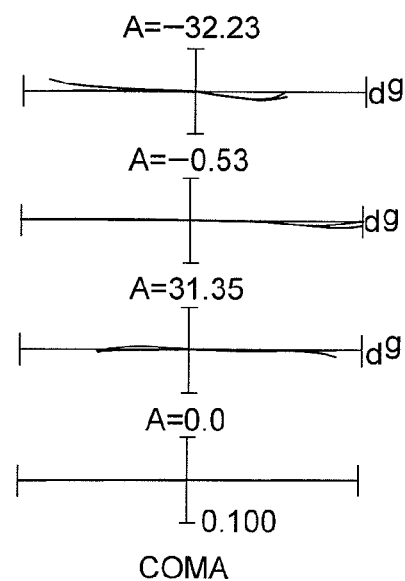
Figure 7:
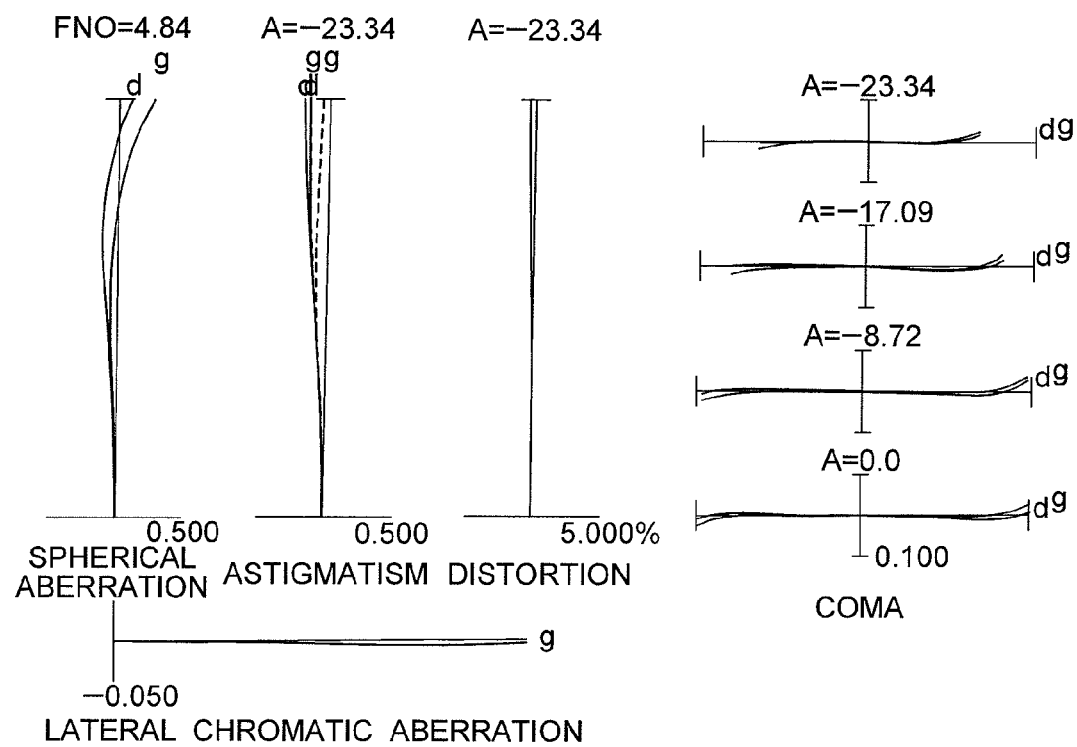
FIG. 7 shows various aberrations in the intermediate focal length state of the zoom lens system according to Example 2.
Figure 8A:
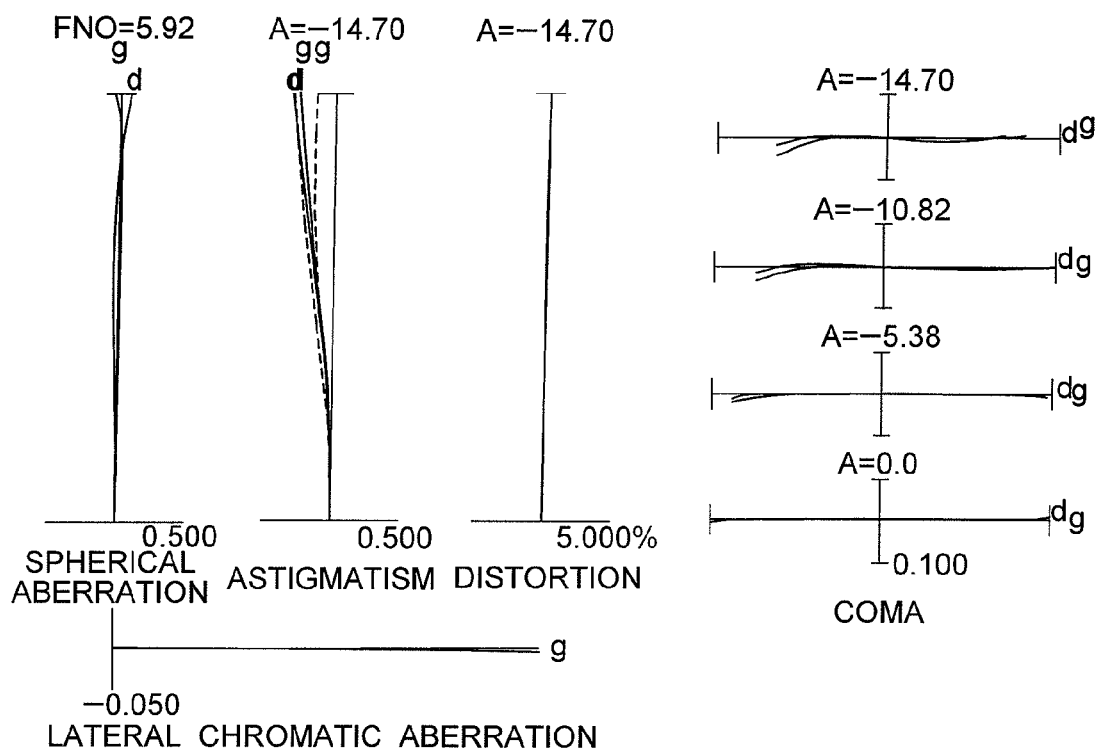
FIGS. 8A, and 8B are graphs showing various aberrations in the telephoto end state of the zoom lens system according to Example 2, and coma upon shifting.
Figure 8B:
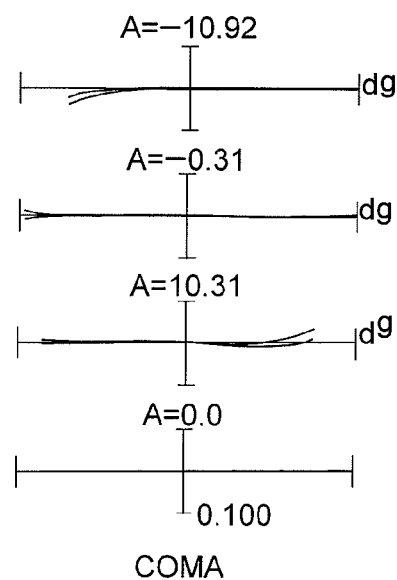

(1) $|f1|/(fw \times ft)^{1/2} = 0.739$
(2) $f2/(-f1) = 1.33$
(3) $n1 = 1.80400, 1.80400, 1.80518$
(4) $f3/f1 = 1.87$
(5) $(Dt - Dw)/fw = 1.04$
(6) $(Dt - Dw)/Ymax = 1.20$
(7) $|RA \times f1| = 885$
(8) $f11/f1 = 1.91$
(9) $f4/f2 = 1.41$
(10) $f4/(-f3) = 1.00$ FIGS. 6A, and 6B are graphs showing various aberrations in the wide-angle end state of the zoom lens system according to Example 2, and coma upon shifting. FIG. 7 shows various aberrations in the intermediate focal length state of the zoom lens system according to Example 2. FIGS. 8A, and 8B are graphs showing various aberrations in the telephoto end state of the zoom lens system according to Example 2, and coma upon shifting.

As is apparent from FIG. 6A through 8B, the zoom lens system according to Example 2 shows superb optical performance as a result of good corrections to various aberrations in the wide-angle end state, in the intermediate focal length state, and in the telephoto end state, even upon shifting.

Example 3

FIG. 9 is a sectional view showing a lens configuration of a zoom lens system in the wide-angle end state according to Example 3 of the present application.

The zoom lens system according to Example 3 is composed of, in order from an object side, a first lens group G1 having negative refractive power, a second lens group G2 having positive refractive power, a third lens group G3 having negative refractive power, and a fourth lens group G4 having positive refractive power.

The first lens group G1 is composed of, in order from the object side, a negative meniscus lens L11 having a convex surface facing the object side, a double concave negative lens L12, a negative meniscus lens L13 having a convex surface facing the object side, and a double convex positive lens L14. The negative meniscus lens L11 is an aspherical lens whose aspherical surface is formed on a resin layer applied on the image plane I side glass lens surface.

The second lens group G2 is composed of, in order from the object side, a cemented lens constructed by a negative meniscus lens L21 having a convex surface facing the object side cemented with a double convex positive lens L22, and a double convex positive lens L23.

The third lens group G3 is composed of a cemented lens constructed by, in order from the object side, a positive meniscus lens L31 having a concave surface facing the object side cemented with a double concave negative lens L32.

The fourth lens group G4 is composed of, in order from the object side, a positive meniscus lens L41 having a concave surface facing the object side, and a cemented lens constructed by a double convex positive lens L42 cemented with a negative meniscus lens L43 having a convex surface facing the image plane I side.

In the zoom lens system according to Example 3, an aperture stop S is disposed between the second lens group G2 and the third lens group G3, and moved integrally with the third lens group G3 upon zooming from a wide-angle end state to a telephoto end state.

In the zoom lens system according to Example 3, upon zooming from the wide-angle end state to the telephoto end state, the first lens group G1 is at first moved to the image plane I side and then moved to the object side, in other words, zooming trajectory of the first lens group G1 has a convex shape facing the image plane I side, the second lens group G2, the third lens group G3 and the fourth lens group G4 are moved to the object side along the optical axis such that a distance between the second lens group G2 and the third lens group G3 increases, and a distance between the third lens group G3 and the fourth lens group G4 decreases. In this instance, the second lens group G2 and the fourth lens group G4 are moved in a body.

In the zoom lens system according to Example 3, the third lens group G3 shifts in a direction including a component perpendicular to the optical axis.

Various values associated with the zoom lens system according to Example 3 are listed in Table 3.

TABLE 3

[Specifications]
Zoom Ratio: 3.12

| | W | M | T |
|---|---|---|---|
| f = | 16.0 | 31.2 | 49.9 |
| FNO = | 3.6 | 4.8 | 5.9 |
| 2ω = | 87.6 | 49.7 | 31.9 |
| Y = | 14.25 | 14.25 | 14.25 |
| TL = | 132.45 | 130.09 | 147.53 |
| Bf = | 38.56 | 57.70 | 82.60 |

[Lens Data]

| i | r | d | nd | νd |
|---|---|---|---|---|
| 1) | 48.776 | 1.90 | 1.51680 | 64.12 |
| 2) | 16.100 | 0.17 | 1.55389 | 38.09 |
| *3) | 13.900 | 11.00 | | |
| 4) | −114.885 | 1.40 | 1.80400 | 46.58 |
| 5) | 28.378 | 3.20 | | |
| 6) | 486.611 | 1.28 | 1.80400 | 46.58 |
| 7) | 87.125 | 0.10 | | |
| 8) | 36.548 | 3.50 | 1.80518 | 25.43 |
| 9) | −893.698 | d9 | | |
| 10) | 31.539 | 0.90 | 1.80518 | 25.43 |
| 11) | 17.844 | 2.89 | 1.51823 | 58.89 |
| 12) | −80.458 | 4.24 | | |
| 13) | 29.000 | 2.30 | 1.51823 | 58.89 |
| 14) | −257.990 | d14 | | |
| 15) | ∞ | 2.90 | Aperture Stop S | |
| 16) | −42.033 | 2.75 | 1.85026 | 32.35 |
| 17) | −14.348 | 0.80 | 1.77250 | 49.61 |
| 18) | 92.894 | d18 | | |
| 19) | −1000.000 | 2.75 | 1.48749 | 70.45 |
| 20) | −23.091 | 0.10 | | |

TABLE 3-continued

| 21) | 113.640 | 5.88 | 1.49782 | 82.56 |
| 22) | −15.170 | 1.00 | 1.80100 | 34.96 |
| 23) | −45.654 | BF | | |

[Aspherical Surface Data]
Surface Number: 3

K = 1
A4 = 2.59080E−05
A6 = 5.94080E−08
A8 = −1.85780E−10
A10 = 9.08510E−13

[Variable Distances]

| | W | M | T |
|---|---|---|---|
| d9 | 29.65 | 8.16 | 0.69 |
| d14 | 1.89 | 7.40 | 11.23 |
| d18 | 10.88 | 5.37 | 1.54 |
| BF | 38.56 | 57.70 | 82.60 |

[Lens Group Data]

| Group | i | focal length |
|---|---|---|
| 1 | 1 | −20.95 |
| 2 | 10 | 29.66 |
| 3 | 15 | −42.98 |
| 4 | 19 | 43.95 |

[Values for Conditional Expressions]

(1) |f1|/(fw × ft)$^{1/2}$ = 0.741
(2) f2/(−f1) = 1.42
(3) n1 = 1.80400, 1.80400, 1.80518
(4) f3/f1 = 2.05
(5) (Dt − Dw)/fw = 1.04
(6) (Dt − Dw)/Ymax = 1.21
(7) |RA × f1| = 879
(8) f11/f1 = 1.90
(9) f4/f2 = 1.48
(10) f4/(−f3) = 1.02

Figure 10A:
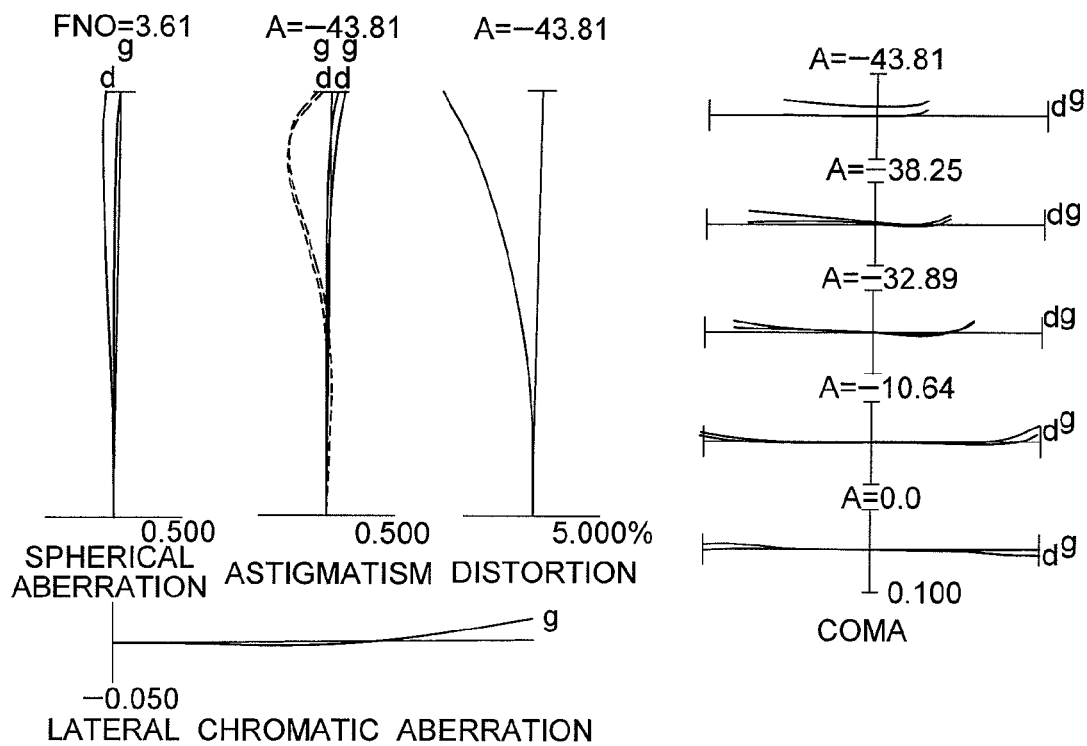
FIGS. 10A, and 10B are graphs showing various aberrations in the wide-angle end state of the zoom lens system according to Example 3, and coma upon shifting.
Figure 10B:
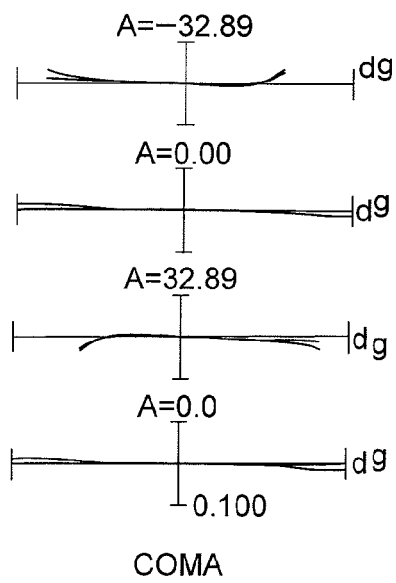
Figure 11:
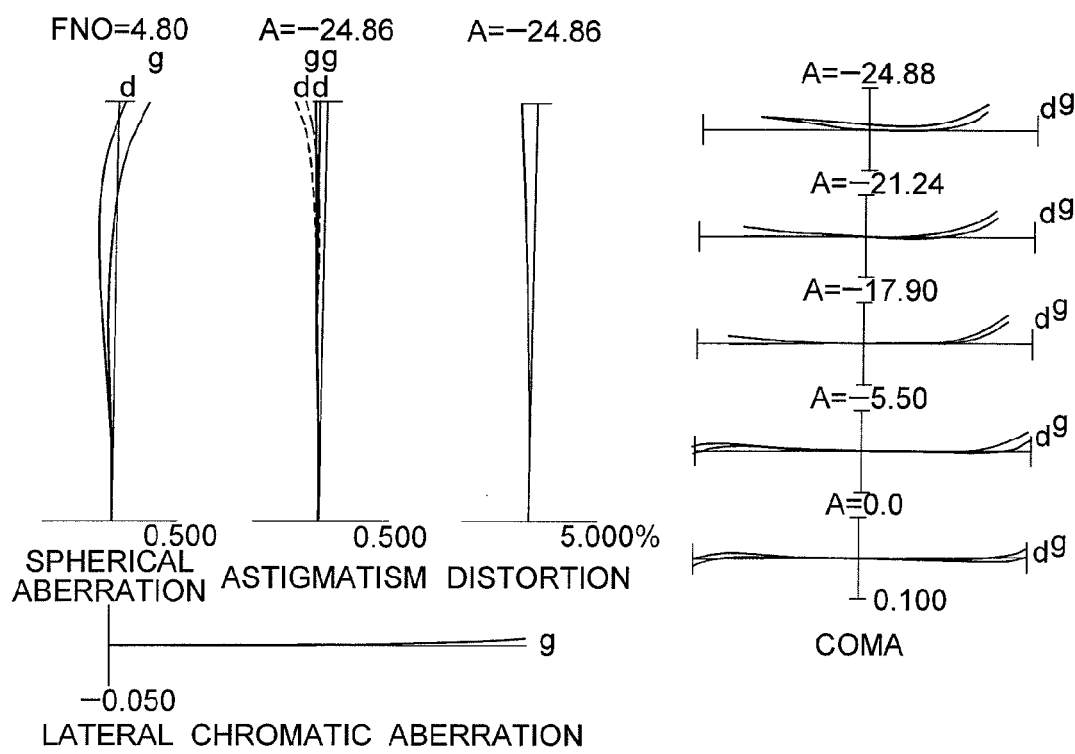
FIG. 11 shows various aberrations in the intermediate focal length state of the zoom lens system according to Example 3.
Figure 12A:
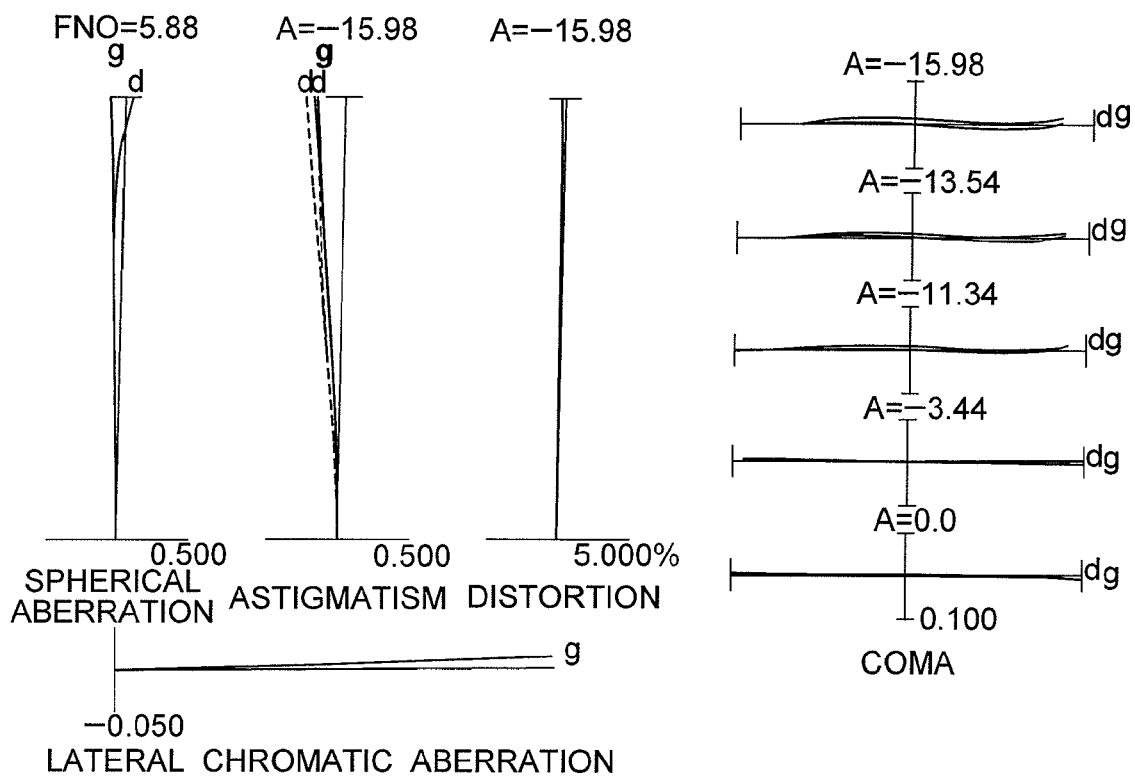
FIGS. 12A, and 12B are graphs showing various aberrations in the telephoto end state of the zoom lens system according to Example 3, and coma upon shifting.
Figure 12B:
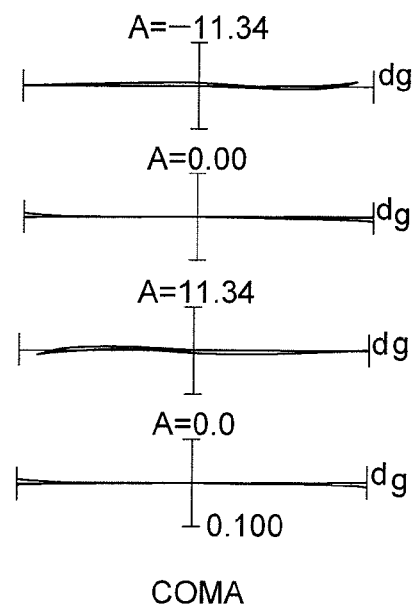

FIGS. 10A, and 10B are graphs showing various aberrations in the wide-angle end state of the zoom lens system according to Example 3, and coma upon shifting. FIG. 11 shows various aberrations in the intermediate focal length state of the zoom lens system according to Example 3. FIGS. 12A, and 12B are graphs showing various aberrations in the telephoto end state of the zoom lens system according to Example 3, and coma upon shifting.

As is apparent from FIG. 10A through 12B, the zoom lens system according to Example 3 shows superb optical performance as a result of good corrections to various aberrations in the wide-angle end state, in the intermediate focal length state, and in the telephoto end state, even upon shifting.

Example 4

Figure 13:
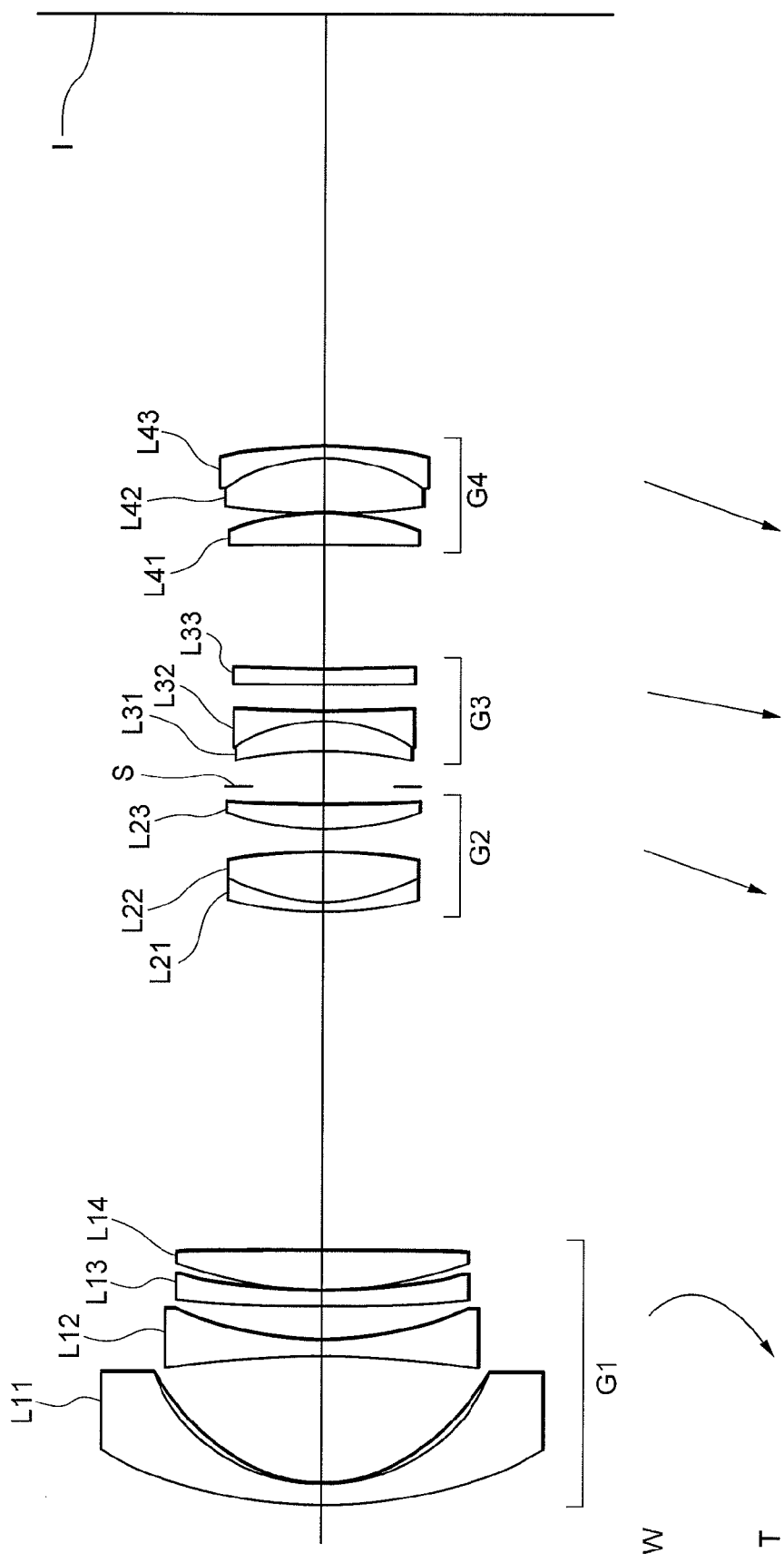
FIG. 13 is a sectional view showing a lens configuration of a zoom lens system in the wide-angle end state according to Example 4 of the present application.

FIG. 13 is a sectional view showing a lens configuration of a zoom lens system in the wide-angle end state according to Example 4 of the present application.

The zoom lens system according to Example 4 is composed of, in order from an object side, a first lens group G1 having negative refractive power, a second lens group G2 having positive refractive power, a third lens group G3 having negative refractive power, and a fourth lens group G4 having positive refractive power.

The first lens group G1 is composed of, in order from the object side, a negative meniscus lens L11 having a convex surface facing the object side, a double concave negative lens L12, a negative meniscus lens L13 having a convex surface facing the object side, and a positive meniscus lens L14 having a convex surface facing the object side. The negative meniscus lens L11 is an aspherical lens whose aspherical surface is formed on a resin layer applied on the image plane I side glass lens surface.

The second lens group G2 is composed of, in order from the object side, a cemented lens constructed by a negative meniscus lens L21 having a convex surface facing the object side cemented with a double convex positive lens L22, and a positive meniscus lens L23 having a convex surface facing the object side.

The third lens group G3 is composed of, in order from the object side, a cemented negative lens constructed by a positive meniscus lens L31 having a concave surface facing the object side cemented with a double concave negative lens L32, and a plano-concave negative lens L33 having a concave surface facing the image plane I side.

The fourth lens group G4 is composed of, in order from the object side, a plano-convex positive lens L41 having a convex surface facing the image plane I side, and a cemented lens constructed by a double convex positive lens L42 cemented with a negative meniscus lens L43 having a convex surface facing the image plane I side.

In the zoom lens system according to Example 4, an aperture stop S is disposed between the second lens group G2 and the third lens group G3, and moved integrally with the third lens group G3 upon zooming from a wide-angle end state to a telephoto end state.

In the zoom lens system according to Example 4, upon zooming from the wide-angle end state to the telephoto end state, the first lens group G1 is at first moved to the image plane I side and then moved to the object side, in other words, zooming trajectory of the first lens group G1 has a convex shape facing the image plane I side, the second lens group G2, the third lens group G3 and the fourth lens group G4 are moved to the object side along the optical axis such that a distance between the second lens group G2 and the third lens group G3 increases, and a distance between the third lens group G3 and the fourth lens group G4 decreases. In this instance, the second lens group G2 and the fourth lens group G4 are moved in a body.

In the zoom lens system according to Example 4, the cemented negative lens in the third lens group G3 shifts in a direction including a component perpendicular to the optical axis.

Various values associated with the zoom lens system according to Example 4 are listed in Table 4.

TABLE 4

[Specifications]
Zoom Ratio: 3.24

| | W | M | T |
|---|---|---|---|
| f = | 16.5 | 32.5 | 53.3 |
| FNO = | 3.6 | 4.9 | 5.9 |
| 2ω = | 84.6 | 47.4 | 29.8 |
| Y = | 14.25 | 14.25 | 14.25 |
| TL = | 131.41 | 129.27 | 148.63 |
| Bf = | 38.56 | 57.91 | 84.73 |

[Lens Data]

| i | r | d | nd | vd |
|---|---|---|---|---|
| 1) | 40.043 | 1.90 | 1.51680 | 64.12 |
| 2) | 16.100 | 0.17 | 1.55389 | 38.09 |
| 3) | 13.900 | 11.00 | | |
| 4) | −114.885 | 1.40 | 1.80400 | 46.58 |

TABLE 4-continued

| | | | | |
|---|---|---|---|---|
| 5) | 30.106 | 3.00 | | |
| 6) | 120.351 | 1.28 | 1.80400 | 46.58 |
| 7) | 50.332 | 0.10 | | |
| 8) | 33.144 | 3.50 | 1.80518 | 25.43 |
| 9) | 838.075 | d9 | | |
| 10) | 31.539 | 0.90 | 1.75520 | 27.51 |
| 11) | 16.806 | 4.30 | 1.51680 | 64.12 |
| 12) | −57.150 | 2.06 | | |
| 13) | 24.603 | 2.10 | 1.51823 | 58.89 |
| 14) | 107.987 | d14 | | |
| 15) | ∞ | 2.90 | Aperture Stop S | |
| 16) | −50.100 | 2.75 | 1.85026 | 32.35 |
| 17) | −14.650 | 0.80 | 1.77250 | 49.61 |
| 18) | 104.520 | 2.50 | | |
| 19) | ∞ | 1.20 | 1.51680 | 64.12 |
| 20) | 100.452 | d20 | | |
| 21) | 0.000 | 2.75 | 1.48749 | 70.45 |
| 22) | −24.078 | 0.10 | | |
| 23) | 74.578 | 4.72 | 1.49782 | 82.56 |
| 24) | −16.452 | 1.00 | 1.80100 | 34.96 |
| 25) | −49.260 | BF | | |

[Aspherical Surface Data]
Surface Number: 3

K = 1
A4 = 2.47620E−05
A6 = 5.94080E−08
A8 = −7.24100E−11
A10 = 6.81200E−13

[Variable Distances]

| | W | M | T |
|---|---|---|---|
| d9 | 29.65 | 8.16 | 0.69 |
| d14 | 1.69 | 7.40 | 11.23 |
| d20 | 11.08 | 5.37 | 1.54 |
| BF | 38.56 | 57.91 | 84.73 |

[Lens Group Data]

| Group | i | focal length |
|---|---|---|
| 1 | 1 | −21.94 |
| 2 | 10 | 29.55 |
| 3 | 15 | −40.37 |
| 4 | 21 | 40.26 |

[Values for Conditional Expressions]

Figure 14A:
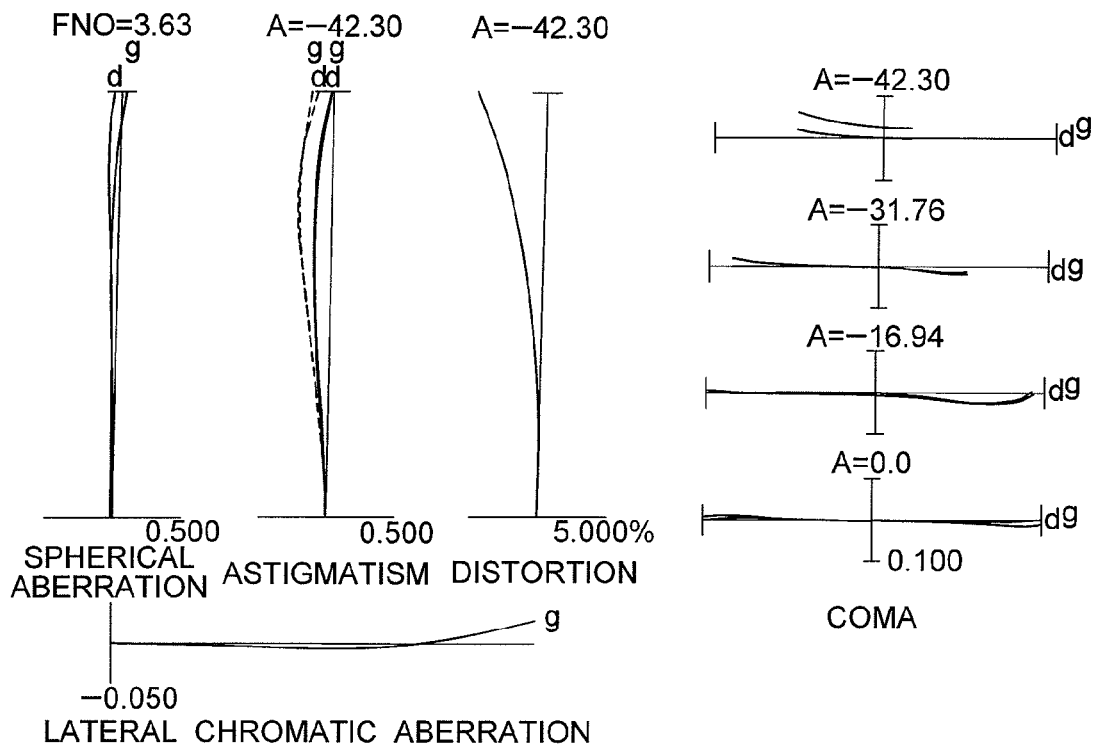
FIGS. 14A, and 14B are graphs showing various aberrations in the wide-angle end state of the zoom lens system according to Example 4, and coma upon shifting.
Figure 14B:
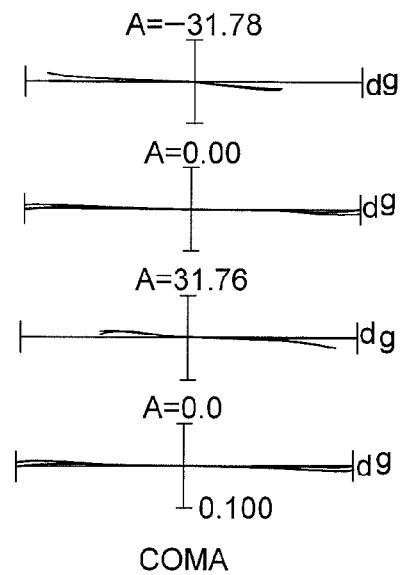
Figure 15:
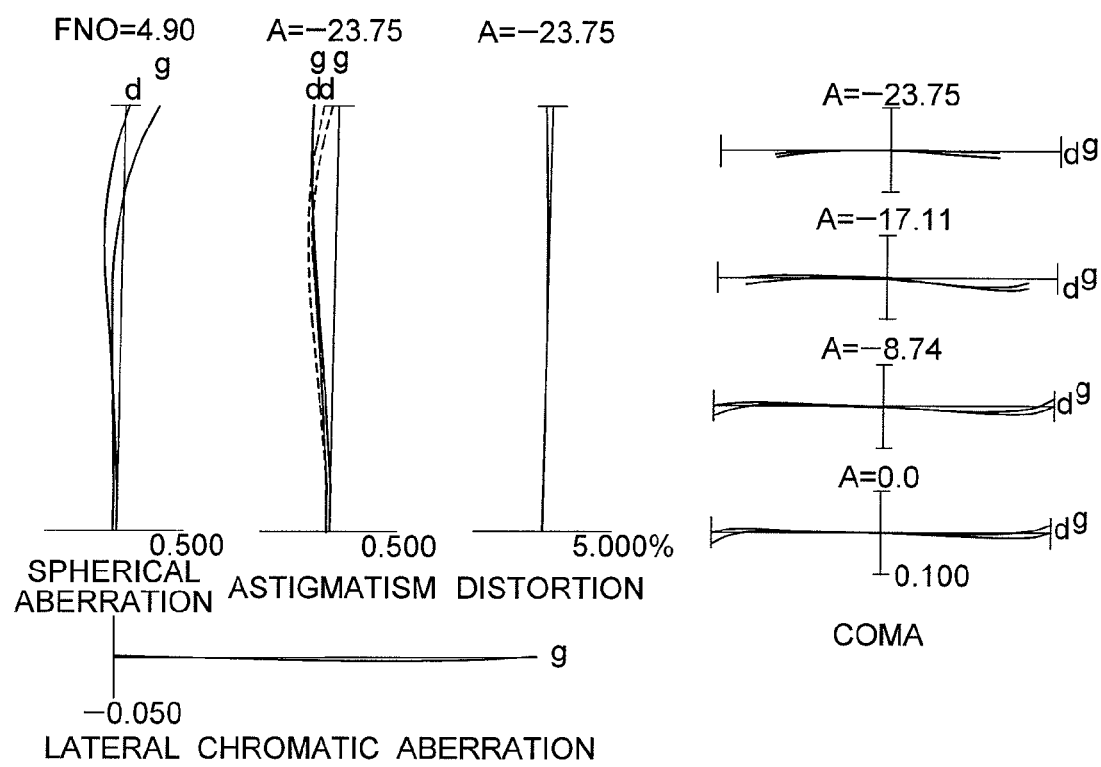
FIG. 15 shows various aberrations in the intermediate focal length state of the zoom lens system according to Example 4.
Figure 16A:
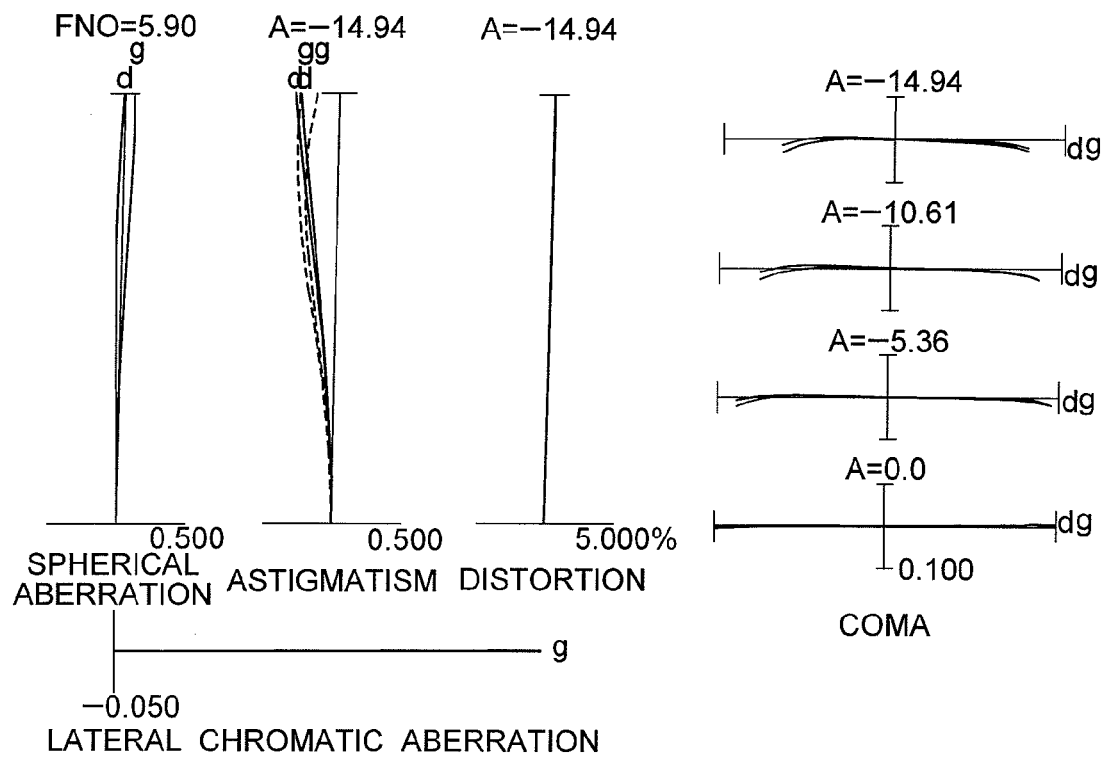
FIGS. 16A, and 16B are graphs showing various aberrations in the telephoto end state of the zoom lens system according to Example 4, and coma upon shifting.
Figure 16B:
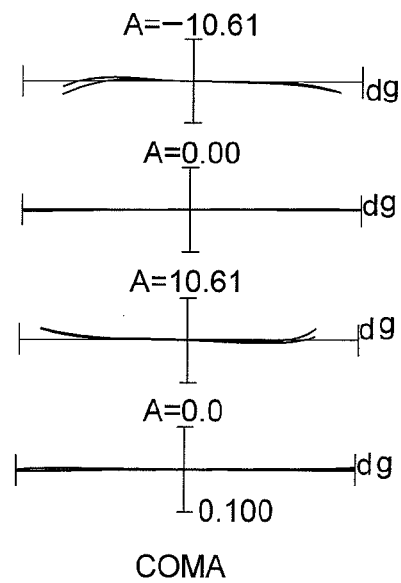

(1) $|f1|/(fw \times ft)^{1/2} = 0.740$
(2) $f2/(-f1) = 1.35$
(3) n1 = 1.80400, 1.80400, 1.80518
(4) $f3/f1 = 1.84$
(5) $(Dt - Dw)/fw = 0.94$
(6) $(Dt - Dw)/Ymax = 1.06$
(7) $|RA \times f1| = 1022$
(8) $f11/f1 = 1.81$
(9) $f4/f2 = 1.36$
(10) $f4/(-f3) = 1.00$ FIGS. 14A, and 14B are graphs showing various aberrations in the wide-angle end state of the zoom lens system according to Example 4, and coma upon shifting. FIG. 15 shows various aberrations in the intermediate focal length state of the zoom lens system according to Example 4. FIGS. 16A, and 16B are graphs showing various aberrations in the telephoto end state of the zoom lens system according to Example 4, and coma upon shifting.

As is apparent from FIG. 14A through 16B, the zoom lens system according to Example 4 shows superb optical performance as a result of good corrections to various aberrations in the wide-angle end state, in the intermediate focal length state, and in the telephoto end state, even upon shifting.

The above-described each Example makes it possible to realize a zoom lens system having a lens capable of shifting in a direction including a component perpendicular to the optical axis, and equipped with a high zoom ratio and excellent optical performance. The above-described each Example only shows a specific example and the present invention is not limited to this.

Then, an imaging apparatus equipped with a zoom lens system according to the present application is explained with reference to FIG. 17.

Figure 17:
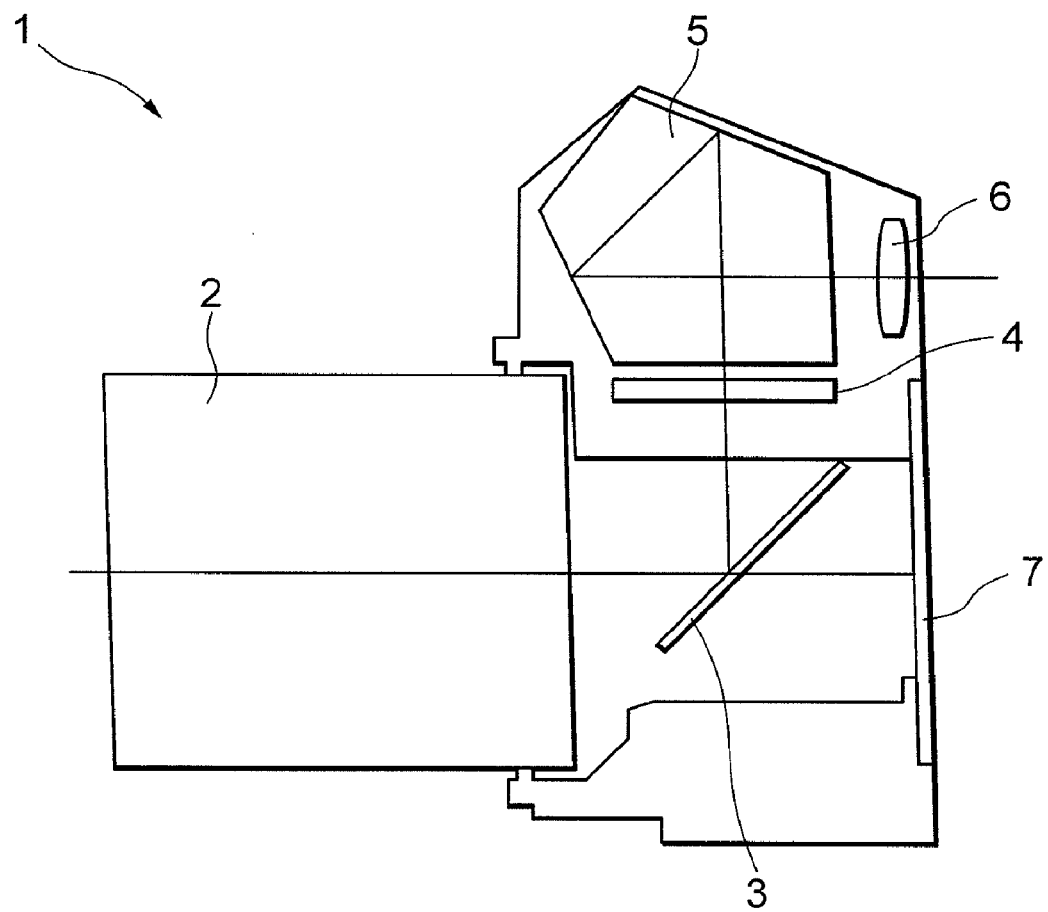
FIG. 17 is a diagram showing a construction of a camera equipped with the zoom lens system according to the present application.

FIG. 17 is a diagram showing a construction of a camera equipped with the zoom lens system according to the present application.

As shown in FIG. 17, the camera 1 is a single lens reflex digital camera equipped with the zoom lens system according to Example 1 as an imaging lens 2.

In the camera 1, light coming out from an object (not shown) is converged by an imaging lens 2, reflected by a quick return mirror 3, and focused on a focusing screen 4. The light focused on the focusing screen 4 is reflected a plurality of times by a pentagonal roof prism 5, and led to an eyepiece 6. Accordingly, a photographer can observe the object image as an erected image through an eyepiece 6.

When the photographer presses a release button (not shown) all the way down, the quick return mirror 3 is retracted from the optical path, the light from the object is detected by an imaging device 7, and a photographed image is captured and stored in a memory (not shown). In this manner, the photographer can take an image of an object by the camera 1.

With the above-described construction, the camera 1 equipped with the zoom lens system according to Example 1 as an imaging lens 2 has a lens capable of shifting in a direction including a component perpendicular to the optical axis and realizes a high zoom ratio and excellent optical performance. Incidentally, a camera equipped with the zoom lens system according to any one of Examples 2 to 4 can perform the same effect as the camera 1.

Then, an outline of a method for manufacturing a zoom lens system is explained below with reference to FIG. 18.

Figure 18:
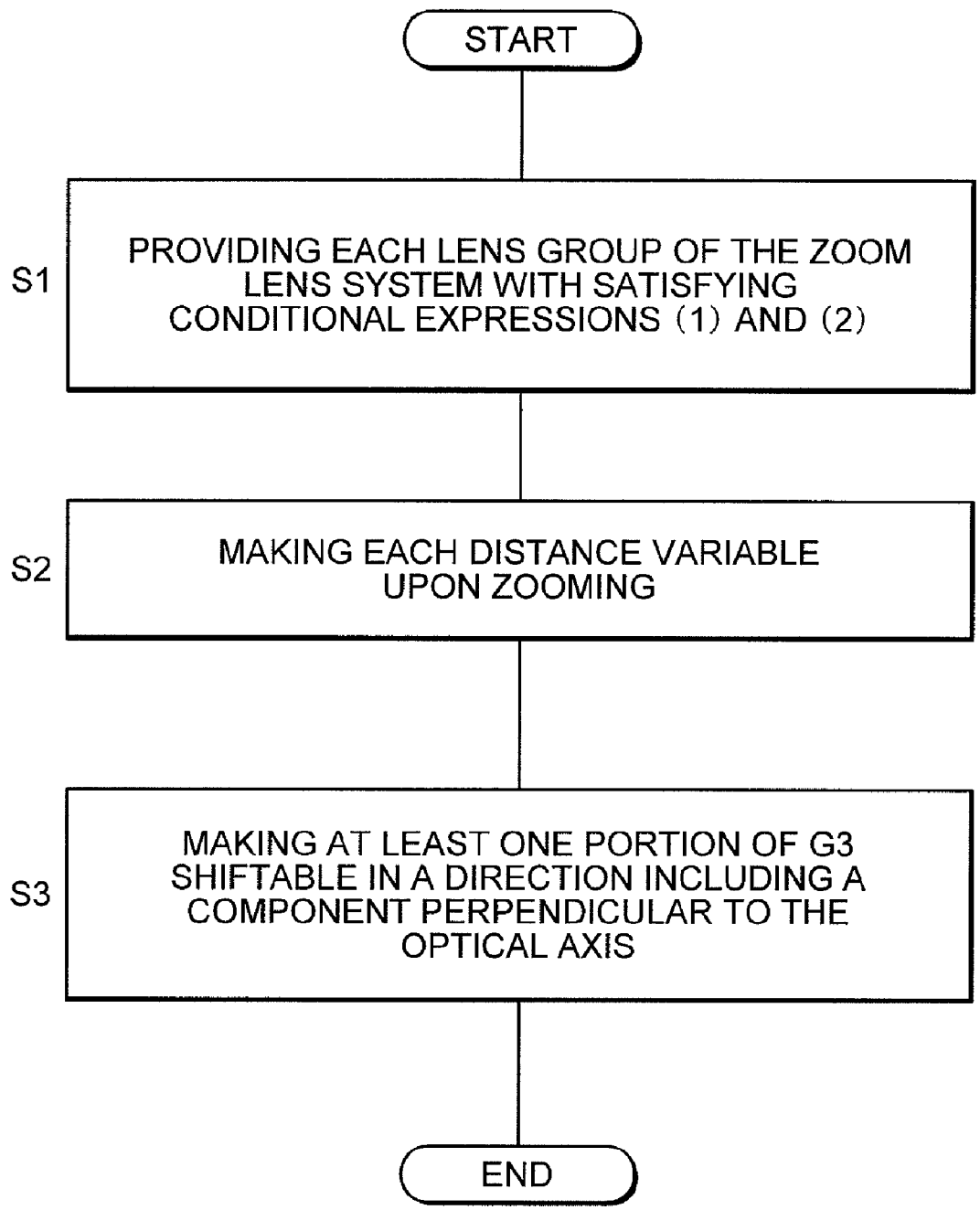
FIG. 18 is a flowchart showing a method for manufacturing the zoom lens system according to the present application.

FIG. 18 is a flowchart showing a method for manufacturing the zoom lens system according to the present application.

The method for manufacturing the zoom lens system according to the present application is a method for manufacturing a zoom lens system comprising, in order from an object side, a first lens group having negative refractive power, a second lens group having positive refractive power, a third lens group having negative refractive power, and a fourth lens group having positive refractive power, and includes respective steps S1 through S3 shown in FIG. 18.

Step S1: providing a first lens group having negative refractive power, a second lens group having positive refractive power, a third lens group having negative refractive power, and a fourth lens group having positive refractive power with satisfying the following conditional expressions (1) and (2), and setting them into a lens barrel having a cylindrical shape in order from object side:

$$0.60 < |f1|/(fw \times ft)^{1/2} < 0.78 \quad (1)$$

$$1.20 < f2/(-f1) < 1.80 \quad (2)$$

where f1 denotes a focal length of the first lens group, f2 denotes a focal length of the second lens group, fw denotes a focal length of the zoom lens system in the wide-angle end state, and ft denotes a focal length of the zoom lens system in the telephoto end state.

Step S2: making each distance along the optical axis between adjacent lens groups variable upon zooming from the wide-angle end state to the telephoto end state by providing a publicly known moving mechanism to each lens group.

Step S3: making at least one portion of the third lens group shiftable in a direction including a component perpendicular to the optical axis by providing a publicly known moving mechanism to at least one portion of the third lens group.

With the method for manufacturing the zoom lens system according to the present application, it becomes possible to manufacture a zoom lens system having a lens capable of shifting in a direction including a component perpendicular to the optical axis, and equipped with a high zoom ratio and excellent optical performance.

Then, an outline of a method for manufacturing a zoom lens system seen from another point of view is explained below with reference to FIG. 19.

Figure 19:
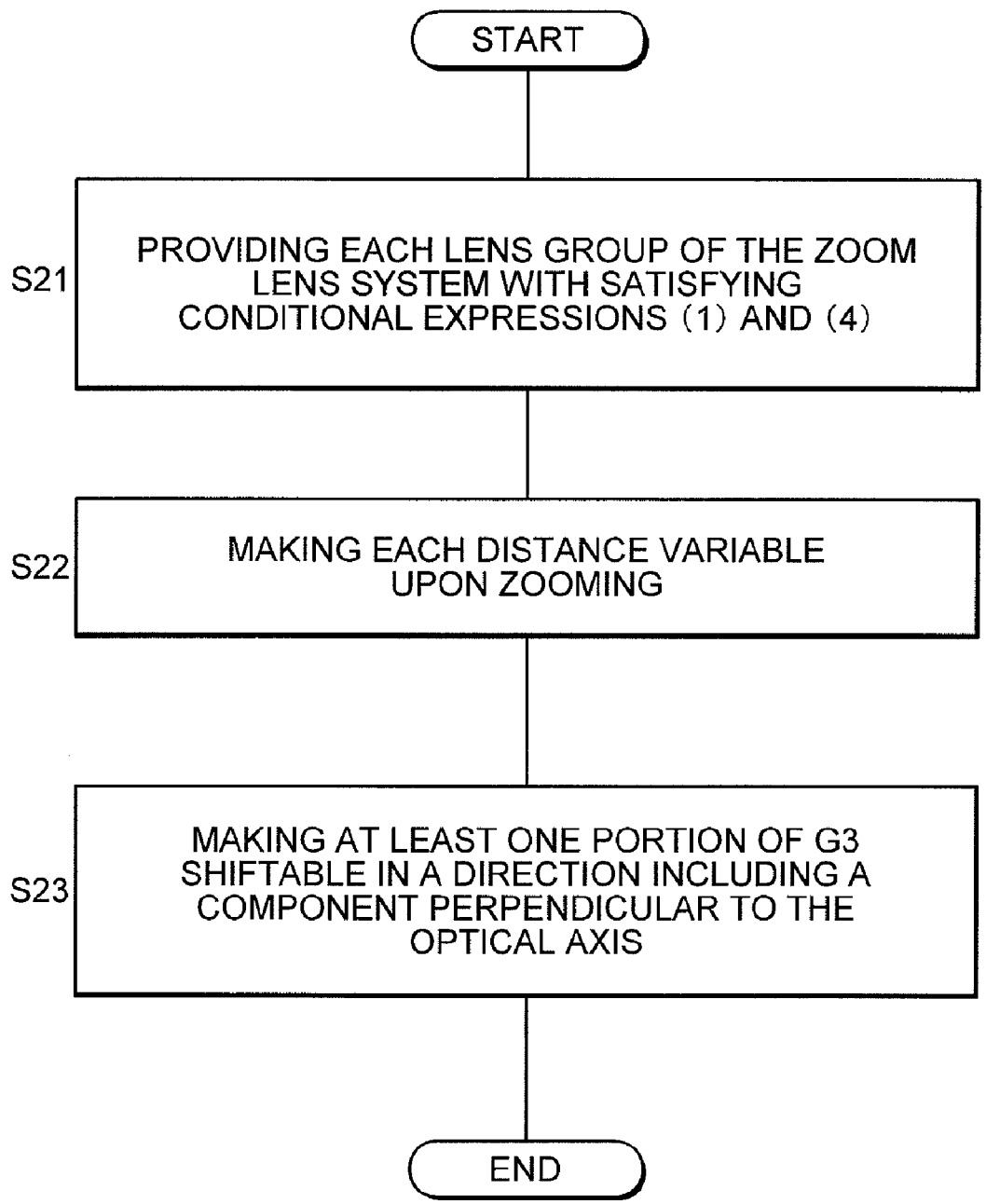
FIG. 19 is a flowchart showing a method for manufacturing the zoom lens system seen from another point of view according to the present application.

FIG. 19 is a flowchart showing a method for manufacturing the zoom lens system seen from another point of view according to the present application.

The method for manufacturing the zoom lens system seen from another point of view according to the present application is a method for manufacturing a zoom lens system comprising, in order from an object side, a first lens group having negative refractive power, a second lens group having positive refractive power, a third lens group having negative refractive power, and a fourth lens group having positive refractive power, and includes respective steps S21 through S23 shown in FIG. 19.

Step S21: providing a first lens group having negative refractive power, a second lens group having positive refractive power, a third lens group having negative refractive power, and a fourth lens group having positive refractive power with satisfying the following conditional expressions (1) and (4), and disposing them into a lens barrel having a cylindrical shape in order from object side:

$$0.60 < |f1|/(fw \times ft)^{1/2} < 0.78 \quad (1)$$

$$1.80 < f3/f1 < 2.50 \quad (4)$$

where f1 denotes a focal length of the first lens group, f3 denotes a focal length of the third lens group, fw denotes a focal length of the zoom lens system in the wide-angle end state, and ft denotes a focal length of the zoom lens system in the telephoto end state.

Step S22: making each distance along the optical axis between adjacent lens groups variable upon zooming from a wide-angle end state to a telephoto end state by providing a publicly known moving mechanism to each lens group.

Step S23: making at least one portion of the third lens group shiftable in a direction including a component perpendicular to the optical axis by providing a publicly known moving mechanism to at least one portion of the third lens group.

With the method for manufacturing the zoom lens system seen from another point of view according to the present application, it becomes possible to manufacture a zoom lens system having a lens capable of shifting in a direction including a component perpendicular to the optical axis, and equipped with a high zoom ratio and excellent optical performance.

Then, an outline of a method for manufacturing a zoom lens system seen from still another point of view is explained below with reference to FIG. 20.

FIG. 20 is a flowchart showing a method for manufacturing the zoom lens system seen from still another point of view according to the present application.

The method for manufacturing the zoom lens system seen from still another point of view according to the present application is a method for manufacturing a zoom lens system comprising, in order from an object side, a first lens group having negative refractive power, a second lens group having positive refractive power, a third lens group having negative refractive power, and a fourth lens group having positive refractive power, and includes respective steps S31 through S33 shown in FIG. 20.

Step S31: providing a first lens group having negative refractive power, a second lens group having positive refractive power, a third lens group having negative refractive power, and a fourth lens group having positive refractive power with satisfying the following conditional expression (5), and disposing them into a lens barrel having a cylindrical shape in order from object side:

$$0.50 < (Dt-Dw)/fw < 1.50 \quad (5)$$

where Dt denotes a distance along the optical axis between the most object side lens surface of the zoom lens system and the image plane in the telephoto end state, Dw denotes a distance along the optical axis between the most object side lens surface of the zoom lens system and the image plane in the wide-angle end state, and fw denotes a focal length of the zoom lens system in the wide-angle end state.

Step S32: making each distance along the optical axis between adjacent lens groups variable upon zooming from a wide-angle end state to a telephoto end state by providing a publicly known moving mechanism to each lens group.

Step S33: making at least one portion of the third lens group shiftable in a direction including a component perpendicular to the optical axis by providing a publicly known moving mechanism to at least one portion of the third lens group.

With the method for manufacturing the zoom lens system seen from still another point of view according to the present application, it becomes possible to manufacture a zoom lens system having a lens capable of shifting in a direction including a component perpendicular to the optical axis, and equipped with a high zoom ratio and excellent optical performance.

Incidentally, the following description may suitably be applied within limits that do not deteriorate optical performance.

Although a zoom lens system with a four-lens-group configuration is shown as each Example of the present application, the lens-group configuration according to the present application is not limited to this, other lens-group configurations such as a five-lens-group configuration is possible. More specifically, a lens or a lens group may be added to the most object side or image plane side of the zoom lens system according to the present application. Incidentally, "a lens group" means at least one lens separated by air spaces that vary upon zooming.

In a zoom lens system according to the present application, in order to carry out focusing from an infinity object to a close object, a portion of a lens group, a lens group, or a plurality of lens groups may be moved along the optical axis as a focusing lens group. It is preferable that at least a portion of the first lens group or at least a portion of the second lens group is used as a focusing lens group. Moreover, such a focusing lens group is suitable for auto focusing, and is suitable for being driven by a motor for auto focusing such as an ultrasonic motor.

In a zoom lens system according to the present application, a lens group or a portion of a lens group may be shifted in a direction including a component perpendicular to the optical axis as a vibration reduction lens group, or tilted (fluctuated) in a direction including the optical axis for correcting an image blur caused by a camera shake. In a zoom lens system according to the present application, it is particularly preferable that at least a portion of the third lens group is used as a vibration reduction lens group.

A lens surface of a lens composing a zoom lens system according to the present application may be a spherical surface, a plane surface, or an aspherical surface. When a lens surface is a spherical surface or a plane surface, lens processing, assembling and adjustment become easy, and deterioration in optical performance caused by lens processing, assembling and adjustment errors can be prevented, so that it is preferable. Moreover, even if the surface is shifted, deterioration in optical performance is little, so that it is preferable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

In a zoom lens system according to the present application, although an aperture stop is preferably provided inside or in the vicinity of the third lens group, the function may be substituted by a lens frame without disposing a member as an aperture stop.

An antireflection coating having high transmittance over a broad wavelength range may be applied to each lens surface of a zoom lens system according to the present application to reduce flare or ghost images, so that high optical performance with high contrast can be attained.

In a zoom lens system according to the present application, a zoom ratio is about 2 to 5.

In a zoom lens system according to the present application, the first lens group preferably has one positive lens element and two negative lens elements, or one positive lens element and three negative lens elements. The first lens group preferably disposes these lens elements, in order from the object side, negative-negative-positive or negative-negative-negative-positive with an air space between each of them.

In a zoom lens system according to the present application, the second lens group preferably has two positive lens elements, or two positive lens elements and one negative lens element. In the latter case, the second lens group preferably disposes these lens elements, in order from the object side, negative-positive-positive with an air space between them.

In a zoom lens system according to the present application, the third lens group preferably has one negative lens element, or two negative lens elements.

In a zoom lens system according to the present application, the fourth lens group preferably has two positive lens elements, or two positive lens elements and one negative lens element. In the latter case, the fourth lens group preferably disposes these lens elements, in order from the object side, positive-positive-negative with an air space between them.

What is claimed is:

1. A zoom lens system comprising, in order from an object side:
    a first lens group having negative refractive power;
    a second lens group having positive refractive power;
    a third lens group having negative refractive power; and
    a fourth lens group having positive refractive power;
    upon zooming from a wide-angle end state to a telephoto end state, each distance between adjacent lens groups varying,
    at least one portion of the third lens group shifting in a direction including a component perpendicular to an optical axis, and
    the following conditional expressions being satisfied:

$$0.60 < |f1|/(fw \times ft)^{1/2} < 0.78$$

$$1.20 < f2/(-f1) < 1.80$$

where f1 denotes a focal length of the first lens group, f2 denotes a focal length of the second lens group, fw denotes a focal length of the zoom lens system in the wide-angle end state, and ft denotes a focal length of the zoom lens system in the telephoto end state.

2. The zoom lens system according to claim 1, wherein the first lens group has at least two lenses that satisfy the following conditional expression:

$$1.750 < n1 < 2.500$$

where n1 denotes a refractive index of a lens in the first lens group at d-line, in which the wavelength λ=587.6 nm.

3. The zoom lens system according to claim 1, wherein the following conditional expression is satisfied:

$$1.80 < f3/f1 < 2.50$$

where f1 denotes a focal length of the first lens group, and f3 denotes a focal length of the third lens group.

4. The zoom lens system according to claim 1, wherein the following conditional expression is satisfied:

$$0.50 < (Dt-Dw)/fw < 1.50$$

where Dt denotes a distance along the optical axis between the most object side lens surface of the zoom lens system and an image plane in the telephoto end state, Dw denotes a distance along the optical axis between the most object side lens surface of the zoom lens system and an image plane in the wide-angle end state, and fw denotes a focal length of the zoom lens system in the wide-angle end state.

5. The zoom lens system according to claim 1, wherein the following conditional expression is satisfied:

$$0.60 < (Dt-Dw)/Y\max < 1.60$$

where Dt denotes a distance along the optical axis between the most object side lens surface of the zoom lens system and an image plane in the telephoto end state, Dw denotes a distance along the optical axis between the most object side lens surface of the zoom lens system and an image plane in the wide-angle end state, and Ymax denotes the maximum image height.

6. The zoom lens system according to claim 1, wherein the following conditional expression is satisfied:

$$400 < |RA \times f1| < 1300$$

where RA denotes a radius of curvature of the most object side lens surface in the zoom lens system in mm, and f1 denotes a focal length of the first lens group in mm.

7. The zoom lens system according to claim 1, wherein the first lens group has a negative lens locating to the most object side, and the following conditional expression is satisfied:

$$1.40 < f11/f1 < 2.10$$

where f1 denotes a focal length of the first lens group, and f11 denotes a focal length of the negative lens locating to the most object side in the first lens group.

8. The zoom lens system according to claim 1, wherein the following conditional expression is satisfied:

$$1.00 < f4/f2 < 2.00$$

where f2 denotes a focal length of the second lens group, and f4 denotes a focal length of the fourth lens group.

9. The zoom lens system according to claim 1, wherein the following conditional expression is satisfied:

$$0.80 < f4/(-f3) < 1.30$$

where f3 denotes a focal length of the third lens group, and f4 denotes a focal length of the fourth lens group.

10. The zoom lens system according to claim 1, wherein an aperture stop is disposed between the second lens group and the fourth lens group.

11. The zoom lens system according to claim 1, wherein the third lens group includes at least one cemented lens.

12. The zoom lens system according to claim 1, wherein the first lens group is composed of at least two negative lenses and at least one positive lens.

13. The zoom lens system according to claim 1, wherein the first lens group includes an aspherical lens.

14. The zoom lens system according to claim 1, wherein upon zooming from the wide-angle end state to the telephoto end state, the second lens group and the fourth lens group are moved in a body.

15. The zoom lens system according to claim 1, wherein upon zooming from the wide-angle end state to the telephoto end state, a distance between the second lens group and the third lens group increases, and a distance between the third lens group and the fourth lens group decrease.

16. An imaging apparatus equipped with the zoom lens system according to claim 1.

17. A zoom lens system comprising, in order from an object side:
a first lens group having negative refractive power;
a second lens group having positive refractive power;
a third lens group having negative refractive power; and
a fourth lens group having positive refractive power;
upon zooming from a wide-angle end state to a telephoto end state, each distance between adjacent lens groups varying,
at least one portion of the third lens group shifting in a direction including a component perpendicular to an optical axis,
the following conditional expression being satisfied:

$$0.60 < |f1|/(fw \times ft)^{1/2} < 0.78$$

where f1 denotes a focal length of the first lens group, fw denotes a focal length of the zoom lens system in the wide-angle end state, and ft denotes a focal length of the zoom lens system in the telephoto end state, and
the first lens group having at least two lenses that satisfy the following conditional expression:

$$1.750 < n1 < 2.500$$

where n1 denotes a refractive index of a lens in the first lens group at d-line, in which the wavelength $\lambda$=587.6 nm.

18. A zoom lens system comprising, in order from an object side:
a first lens group having negative refractive power;
a second lens group having positive refractive power;
a third lens group having negative refractive power; and
a fourth lens group having positive refractive power;
the third lens group including a cemented negative lens;
upon zooming from a wide-angle end state to a telephoto end state, each distance between adjacent lens groups varying,
at least one portion of the third lens group shifting in a direction including a component perpendicular to an optical axis, and
the following conditional expressions being satisfied:

$$0.60 < |f1|/(fw \times ft)^{1/2} < 0.78$$

$$1.80 < f3/f1 < 2.50$$

where f1 denotes a focal length of the first lens group, f3 denotes a focal length of the third lens group, fw denotes a focal length of the zoom lens system in the wide-angle end state, and ft denotes a focal length of the zoom lens system in the telephoto end state.

19. A zoom lens system comprising, in order from an object side:
a first lens group having negative refractive power;
a second lens group having positive refractive power;
a third lens group having negative refractive power; and
a fourth lens group having positive refractive power;
upon zooming from a wide-angle end state to a telephoto end state, each distance between adjacent lens groups varying,
at least one portion of the third lens group shifting in a direction including a component perpendicular to an optical axis, and
the following conditional expression being satisfied:

$$0.50 < (Dt - Dw)/fw < 1.50$$

where Dt denotes a distance along the optical axis between the most object side lens surface of the zoom lens system and an image plane in the telephoto end state, Dw denotes a distance along the optical axis between the most object side lens surface of the zoom lens system and an image plane in the wide-angle end state, and fw denotes a focal length of the zoom lens system in the wide-angle end state.

20. A method for manufacturing a zoom lens system that includes, in order from an object side, a first lens group having negative refractive power, a second lens group having positive refractive power, a third lens group having negative refractive power, and a fourth lens group having positive refractive power, the method comprising steps of:
providing and disposing each lens group satisfying the following conditional expressions:

$$0.60 < |f1|/(fw \times ft)^{1/2} < 0.78$$

$$1.20 < f2/(-f1) < 1.80$$

where f1 denotes a focal length of the first lens group, f2 denotes a focal length of the second lens group, fw denotes a focal length of the zoom lens system in the wide-angle end state, and ft denotes a focal length of the zoom lens system in the telephoto end state;
making each distance between adjacent lens groups variable upon zooming from a wide-angle end state to a telephoto end state; and
making at least one portion of the third lens group shiftable in a direction including a component perpendicular to the optical axis.

21. The method according to claim 20,
further comprising a step of:
providing the first lens group having at least two lenses that satisfy the following conditional expression:

$$1.750 < n1 < 2.500$$

where n1 denotes a refractive index of a lens in the first lens group at d-line, in which the wavelength $\lambda$=587.6 nm.

22. The method according to claim 20, further comprising a step of:
satisfying the following conditional expression:

$$1.80 < f3/f1 < 2.50$$

where f1 denotes a focal length of the first lens group, and f3 denotes a focal length of the third lens group.

23. The method according to claim 20, further comprising a step of:

satisfying the following conditional expression:

$$0.50 < (Dt-Dw)/fw < 1.50$$

where Dt denotes a distance along the optical axis between the most object side lens surface of the zoom lens system and an image plane in the telephoto end state, Dw denotes a distance along the optical axis between the most object side lens surface of the zoom lens system and an image plane in the wide-angle end state, and fw denotes a focal length of the zoom lens system in the wide-angle end state.

24. A method for manufacturing a zoom lens system that includes, in order from an object side, a first lens group having negative refractive power, a second lens group having positive refractive power, a third lens group having negative refractive power, and a fourth lens group having positive refractive power, the method comprising steps of:

providing a cemented negative lens in the third lens group;

providing and disposing each lens group satisfying the following conditional expressions:

$$0.60 < |f1|/(fw \times ft)^{1/2} < 0.78$$

$$1.80 < f3/f1 < 2.50$$

where f1 denotes a focal length of the first lens group, f3 denotes a focal length of the third lens group, fw denotes a focal length of the zoom lens system in the wide-angle end state, and ft denotes a focal length of the zoom lens system in the telephoto end state;

making each distance between adjacent lens groups variable upon zooming from a wide-angle end state to a telephoto end state; and making at least one portion of the third lens group shiftable in a direction including a component perpendicular to the optical axis.

25. A method for manufacturing a zoom lens system that includes, in order from an object side, a first lens group having negative refractive power, a second lens group having positive refractive power, a third lens group having negative refractive power, and a fourth lens group having positive refractive power, the method comprising steps of:

providing and disposing each lens group satisfying the following conditional expression:

$$0.50 < (Dt-Dw)/fw < 1.50$$

where Dt denotes a distance along the optical axis between the most object side lens surface of the zoom lens system and an image plane in the telephoto end state, Dw denotes a distance along the optical axis between the most object side lens surface of the zoom lens system and an image plane in the wide-angle end state, and fw denotes a focal length of the zoom lens system in the wide-angle end state;

making each distance between adjacent lens groups variable upon zooming from a wide-angle end state to a telephoto end state; and making at least one portion of the third lens group shiftable in a direction including a component perpendicular to the optical axis.

* * * * *